(12) United States Patent
Saraee et al.

(10) Patent No.: US 12,259,945 B2
(45) Date of Patent: *Mar. 25, 2025

(54) SYSTEMS, METHODS, AND STORAGE MEDIA FOR TRAINING A MODEL FOR IMAGE EVALUATION

(71) Applicant: VIZIT LABS, INC., Boston, MA (US)

(72) Inventors: Elham Saraee, Medford, MA (US); Jehan Hamedi, Wellesley, MA (US); Zachary Halloran, Franklin, MA (US)

(73) Assignee: VIZIT LABS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/922,058

(22) Filed: Oct. 21, 2024

(65) Prior Publication Data

US 2025/0045358 A1    Feb. 6, 2025

Related U.S. Application Data

(60) Continuation of application No. 18/737,861, filed on Jun. 7, 2024, now Pat. No. 12,124,535, which is a continuation of application No. 18/416,371, filed on Jan. 18, 2024, now Pat. No. 12,019,707, which is a continuation of application No. 18/471,771, filed on Sep. 21, 2023, now Pat. No. 11,880,429, which is a continuation of application No. 17/979,978, filed on
(Continued)

(51) Int. Cl.
*G06F 18/21* (2023.01)
*G06F 18/214* (2023.01)
*G06F 18/22* (2023.01)
*G06V 10/40* (2022.01)
*G06V 10/82* (2022.01)

(52) U.S. Cl.
CPC ............ *G06F 18/214* (2023.01); *G06F 18/22* (2023.01); *G06V 10/40* (2022.01); *G06V 10/82* (2022.01)

(58) Field of Classification Search
CPC ....... G06F 18/214; G06F 18/22; G06V 10/40; G06V 10/82
See application file for complete search history.

(56) References Cited

U.S. PATENT DOCUMENTS 8,073,253 B2    12/2011    Li et al.
9,996,890 B1 *   6/2018    Cinnamon ........... G06V 10/764
(Continued)

*Primary Examiner* — Ming Y Hon
(74) *Attorney, Agent, or Firm* — FOLEY & LARDNER LLP

(57) ABSTRACT

A method may include executing a neural network to extract a first plurality of features from a plurality of first training images and a second plurality of features from a second training image; generating a model comprising a first image performance score for each of the plurality of first training images and a feature weight for each feature, the feature weight for each feature of the first plurality of features calculated based on an impact of a variation in the feature on first image performance scores of the plurality of first training images; training the model by adjusting the impact of a variation of each of a first set of features that correspond to the second plurality of features; executing the model using a third set of features from a candidate image to generate a candidate image performance score; and generating a record identifying the candidate image performance score.

19 Claims, 12 Drawing Sheets

Related U.S. Application Data

Nov. 3, 2022, now Pat. No. 11,768,913, which is a continuation of application No. 17/857,980, filed on Jul. 5, 2022, now Pat. No. 11,531,840, which is a continuation-in-part of application No. 17/466,820, filed on Sep. 3, 2021, now Pat. No. 11,663,811, which is a continuation of application No. 16/672,227, filed on Nov. 1, 2019, now Pat. No. 11,113,572, which is a division of application No. 16/271,780, filed on Feb. 8, 2019, now Pat. No. 10,467,504.

(60) Provisional application No. 63/218,814, filed on Jul. 6, 2021.

(56) References Cited

U.S. PATENT DOCUMENTS

| | | | |
|---|---|---|---|
| 10,049,308 B1 | 8/2018 | Dhua et al. | |
| 10,176,198 B1 * | 1/2019 | Dhua | G06V 10/761 |
| 10,410,108 B2 * | 9/2019 | Shaji | G06F 18/24133 |
| 10,467,504 B1 | 11/2019 | Hamedi et al. | |
| 10,732,783 B2 | 8/2020 | Yang et al. | |
| 10,861,077 B1 * | 12/2020 | Liu | G06Q 30/06 |
| 11,663,811 B2 | 5/2023 | Hamedi et al. | |
| 11,880,429 B1 * | 1/2024 | Saraee | G06V 10/776 |
| 2003/0021481 A1 | 1/2003 | Kasutani | |
| 2005/0123202 A1 | 6/2005 | Hwang et al. | |
| 2012/0269441 A1 | 10/2012 | Marchesotti et al. | |
| 2013/0142418 A1 * | 6/2013 | Van Zwol | G06V 20/47 |
| | | | 382/159 |
| 2015/0172056 A1 | 6/2015 | Meunier et al. | |
| 2016/0063205 A1 | 3/2016 | Moturu et al. | |
| 2016/0098844 A1 * | 4/2016 | Shaji | G06T 9/002 |
| | | | 382/156 |
| 2016/0280268 A1 | 9/2016 | Hassani et al. | |
| 2016/0300125 A1 | 10/2016 | Barker | |
| 2016/0335120 A1 * | 11/2016 | Gupta | G06F 9/5044 |
| 2017/0024761 A1 * | 1/2017 | Ruiz | G06Q 30/0273 |
| 2017/0100078 A1 | 4/2017 | Han | |
| 2018/0039879 A1 * | 2/2018 | Shaji | G06N 3/082 |
| 2018/0061051 A1 | 3/2018 | Matsunaga | |
| 2018/0157838 A1 | 6/2018 | Bushey et al. | |
| 2018/0174190 A1 * | 6/2018 | Ferreira | G06Q 50/01 |
| 2018/0189609 A1 * | 7/2018 | Park | G06F 18/41 |
| 2019/0026609 A1 * | 1/2019 | Shen | G06N 3/08 |
| 2019/0080176 A1 * | 3/2019 | Lan | G06V 20/46 |
| 2019/0080456 A1 * | 3/2019 | Song | G06T 7/174 |
| 2019/0095715 A1 | 3/2019 | Nunes et al. | |
| 2019/0102528 A1 | 4/2019 | Beacham et al. | |
| 2019/0147340 A1 * | 5/2019 | Zhang | G06N 3/084 |
| | | | 706/25 |
| 2019/0171902 A1 | 6/2019 | Yamaguchi et al. | |
| 2019/0180109 A1 * | 6/2019 | Sinha | H04N 21/4223 |
| 2019/0245925 A1 * | 8/2019 | Yamamoto | G06F 16/958 |
| 2020/0050831 A1 * | 2/2020 | Rogan | G06V 20/693 |
| 2020/0111022 A1 * | 4/2020 | Silberman | G06N 3/044 |
| 2021/0182613 A1 * | 6/2021 | Zhang | G06N 3/006 |
| 2021/0264161 A1 * | 8/2021 | Saraee | G06F 18/2413 |
| 2021/0350284 A1 * | 11/2021 | Agrawal | G06N 3/045 |
| 2022/0012471 A1 * | 1/2022 | Yuan | G06V 10/82 |
| 2022/0249175 A1 * | 8/2022 | Tolkowsky | A61B 6/5247 |
| 2022/0335256 A1 * | 10/2022 | Saraee | G06F 18/22 |
| 2023/0366738 A1 | 11/2023 | Yang et al. | |

* cited by examiner

SYSTEMS, METHODS, AND STORAGE MEDIA FOR TRAINING A MODEL FOR IMAGE EVALUATION

CROSS-REFERENCE TO RELATED APPLICATIONS

This application claims the benefit of priority as a continuation to U.S. application Ser. No. 18/737,861, filed Jun. 7, 2024, which claims the benefit of priority to U.S. application Ser. No. 18/416,371, filed Jan. 18, 2024, which claims the benefit of priority as a continuation to U.S. application Ser. No. 18/471,771, filed Sep. 21, 2023, which claims the benefit of priority as a continuation to U.S. application Ser. No. 17/979,978, filed Nov. 3, 2022, which claims the benefit of priority as a continuation to U.S. application Ser. No. 17/857,980, filed Jul. 5, 2022, which claims the benefit of priority as a continuation in part to U.S. application Ser. No. 17/466,820, filed Sep. 3, 2021, which claims the benefit of priority as a continuation to U.S. patent application Ser. No. 16/672,227, filed Nov. 1, 2019, which claims the benefit of priority as a divisional to U.S. patent application Ser. No. 16/271,780, filed Feb. 8, 2019, each of which is hereby incorporated by reference in its entirety. U.S. application Ser. No. 17/857,980 also claims the benefit of priority to U.S. Provisional Application No. 63/218,814, filed Jul. 6, 2021, the entirety of which is incorporated by reference herein.

FIELD OF THE DISCLOSURE

The present disclosure relates to systems, methods, and storage media for training a model for image evaluation.

BACKGROUND

Many people use the internet every day. Some use it to discover information such as news, recipes, phone numbers, etc. Some use the internet to communicate with others through mediums such as chat rooms, message boards, and e-mail. Traffic on the internet is large and many people use the internet for extended amounts of time.

SUMMARY

One aspect of the present disclosure relates to a system configured for evaluating images. The system may include one or more hardware processors configured by machine-readable instructions. The processor(s) may be configured to select a set of training images. The processor(s) may be configured to extract a first set of features from each training image of the set of training images to generate a first feature tensor for each training image. The processor(s) may be configured to extract a second set of features from each training image to generate a second feature tensor for each training image. The processor(s) may be configured to reduce a dimensionality of each first feature tensor to generate a first modified feature tensor for each training image. The processor(s) may be configured to reduce a dimensionality of each second feature tensor to generate a second modified feature tensor for each training image. The processor(s) may be configured to construct a first generative model representing the first set of features and a second generative model representing the second set of features of the set of training images, based on the first modified feature tensors and the second modified feature tensors of each training image of the set of training images. The processor(s) may be configured to identify a first candidate image. The processor(s) may be configured to apply a regression algorithm to the first candidate image and each of the first generative model and the second generative model to determine whether the first candidate image is similar to the set of training images.

In some implementations of the system, the processor(s) may be configured to calculate a similarity score representing a degree of visual similarity between the first candidate image and the set of training images, based on the regression algorithm.

In some implementations of the system, the processor(s) may be configured to calculate a uniqueness score of the first candidate image with respect to the set of training images.

In some implementations of the system, calculating the uniqueness score of the first candidate image may include calculating an inverse of the similarity score. In some implementations of the system, calculating the uniqueness score of the first candidate image may include identifying the inverse as the uniqueness score.

In some implementations of the system, the processor(s) may be configured to extract features from the first candidate image to generate a candidate image feature tensor. In some implementations of the system, the features may correspond to the first set of features extracted from each candidate image. In some implementations of the system, the processor(s) may be configured to reduce a dimensionality of the candidate image feature tensor to generate a modified candidate image feature tensor. In some implementations of the system, determining whether the candidate image may be similar to the set of training images includes comparing the modified candidate image feature tensor with the first generative model.

In some implementations of the system, the processor(s) may be configured to apply a weight to the features extracted from the candidate image to generate a set of weighted candidate image features. In some implementations of the system, the candidate image feature tensor may be generated based on the set of weighted candidate image features.

In some implementations of the system, the first set of features extracted from each training image may include object features. In some implementations of the system, the processor(s) may be configured to extract the first set of features from each training image by propagating data corresponding to each training image through at least one network including at least one of an object detection neural network, an object classification neural network, or an object recognition neural network. In some implementations of the system, the network may include an input layer, a plurality of intermediate layers, and an output layer. In some implementations of the system, the processor(s) may be configured to extract the first set of features from each training image by extracting outputs from at least one of the plurality of intermediate layers of the network.

In some implementations of the system, extracting the first set of features from each training image may include extracting at least one of a set of object features, a set of scene features, a set of intensity features, a set of contrast features, a set of color features, and a set of blurriness features from each training image.

In some implementations of the system, the processor(s) may be configured to identify respective locations of the first feature tensor and the second feature tensor in a feature space defined by the first set of features and the second set of features. In some implementations of the system, the processor(s) may be configured to generate a visual signature for the set of training images based on the respective locations of the first feature tensor and the second feature tensor.

In some implementations of the system, the processor(s) may be configured to select the set of training images based on at least one of a common author, a common origin, or a common theme.

In some implementations of the system, the processor(s) may be configured to identify a set of candidate images including the first candidate image. In some implementations of the system, the processor(s) may be configured to determine, for each candidate image of the set of candidate images, whether the candidate image is similar to the set of training images based on the first candidate image and each of the first generative model and the second generative model. In some implementations of the system, the processor(s) may be configured to identify a subset of the set of candidate images that are similar to the set of training images.

In some implementations of the system, the processor(s) may be configured to provide a graphical user interface to be displayed on a computing device. In some implementations of the system, the graphical user interface may display a plurality of indications corresponding to the set of candidate images. In some implementations of the system, the processor(s) may be configured to receive a user selection of a first indication or the plurality of indications corresponding to the first candidate image.

In some implementations of the system, the processor(s) may be configured to identify a brand attribute. In some implementations of the system, the processor(s) may be configured to select the first set of features to be extracted from the set of training images based at least in part on the brand attribute.

In some implementations of the system, reducing the dimensionality of each first feature tensor may include applying principal component analysis to each first feature tensor to generate a first modified feature tensor for each training image.

Another aspect of the present disclosure relates to a method for evaluating images. The method may include selecting a set of training images. The method may include extracting a first set of features from each training image of the set of training images to generate a first feature tensor for each training image. The method may include extracting a second set of features from each training image to generate a second feature tensor for each training image. The method may include reducing a dimensionality of each first feature tensor to generate a first modified feature tensor for each training image. The method may include reducing a dimensionality of each second feature tensor to generate a second modified feature tensor for each training image. The method may include constructing a first generative model representing the first set of features and a second generative model representing the second set of features of the set of training images, based on the first modified feature tensors and the second modified feature tensors of each training image of the set of training images. The method may include identifying a first candidate image. The method may include applying a regression algorithm to the first candidate image and each of the first generative model and the second generative model to determine whether the first candidate image is similar to the set of training images.

In some implementations of the method, it may include calculating a similarity score representing a degree of visual similarity between the first candidate image and the set of training images, based on the regression algorithm.

In some implementations of the method, it may include calculating a uniqueness score of the first candidate image with respect to the set of training images.

In some implementations of the method, calculating the uniqueness score of the first candidate image may include calculating an inverse of the similarity score. In some implementations of the method, calculating the uniqueness score of the first candidate image may include identifying the inverse as the uniqueness score.

In some implementations of the method, it may include extracting features from the first candidate image to generate a candidate image feature tensor. In some implementations of the method, the features may correspond to the first set of features extracted from each candidate image. In some implementations of the method, it may include reducing a dimensionality of the candidate image feature tensor to generate a modified candidate image feature tensor. In some implementations of the method, determining whether the candidate image may be similar to the set of training images includes comparing the modified candidate image feature tensor with the first generative model.

In some implementations of the method, it may include applying a weight to the features extracted from the candidate image to generate a set of weighted candidate image features. In some implementations of the method, the candidate image feature tensor may be generated based on the set of weighted candidate image features.

In some implementations of the method, the first set of features extracted from each training image may include object features. In some implementations of the method, it may include extracting the first set of features from each training image by propagating data corresponding to each training image through at least one network including at least one of an object detection neural network, an object classification neural network, or an object recognition neural network. In some implementations of the method, the network may include an input layer, a plurality of intermediate layers, and an output layer. In some implementations of the method, it may include extracting the first set of features from each training image by extracting outputs from at least one of the plurality of intermediate layers of the network.

In some implementations of the method, extracting the first set of features from each training image may include extracting at least one of a set of object features, a set of scene features, a set of intensity features, a set of contrast features, a set of color features, and a set of blurriness features from each training image.

In some implementations of the method, it may include identifying respective locations of the first feature tensor and the second feature tensor in a feature space defined by the first set of features and the second set of features. In some implementations of the method, it may include generating a visual signature for the set of training images based on the respective locations of the first feature tensor and the second feature tensor.

In some implementations of the method, it may include selecting the set of training images based on at least one of a common author, a common origin, or a common theme.

In some implementations of the method, it may include identifying a set of candidate images including the first candidate image. In some implementations of the method, it may include determining, for each candidate image of the set of candidate images, whether the candidate image is similar to the set of training images based on the first candidate image and each of the first generative model and the second generative model. In some implementations of the method, it may include identifying a subset of the set of candidate images that are similar to the set of training images.

In some implementations of the method, it may include providing a graphical user interface to be displayed on a computing device. In some implementations of the method, the graphical user interface may display a plurality of indications corresponding to the set of candidate images. In some implementations of the method, it may include receiving a user selection of a first indication or the plurality of indications corresponding to the first candidate image.

In some implementations of the method, it may include identifying a brand attribute. In some implementations of the method, it may include selecting the first set of features to be extracted from the set of training images based at least in part on the brand attribute.

In some implementations of the method, reducing the dimensionality of each first feature tensor may include applying principal component analysis to each first feature tensor to generate a first modified feature tensor for each training image.

Yet another aspect of the present disclosure relates to a non-transient computer-readable storage medium having instructions embodied thereon, the instructions being executable by one or more processors to perform a method for evaluating images. The method may include selecting a set of training images. The method may include extracting a first set of features from each training image of the set of training images to generate a first feature tensor for each training image. The method may include extracting a second set of features from each training image to generate a second feature tensor for each training image. The method may include reducing a dimensionality of each first feature tensor to generate a first modified feature tensor for each training image. The method may include reducing a dimensionality of each second feature tensor to generate a second modified feature tensor for each training image. The method may include constructing a first generative model representing the first set of features and a second generative model representing the second set of features of the set of training images, based on the first modified feature tensors and the second modified feature tensors of each training image of the set of training images. The method may include identifying a first candidate image. The method may include applying a regression algorithm to the first candidate image and each of the first generative model and the second generative model to determine whether the first candidate image is similar to the set of training images.

In some implementations of the computer-readable storage medium, the method may include calculating a similarity score representing a degree of visual similarity between the first candidate image and the set of training images, based on the regression algorithm.

In some implementations of the computer-readable storage medium, the method may include calculating a uniqueness score of the first candidate image with respect to the set of training images.

In some implementations of the computer-readable storage medium, calculating the uniqueness score of the first candidate image may include calculating an inverse of the similarity score. In some implementations of the computer-readable storage medium, calculating the uniqueness score of the first candidate image may include identifying the inverse as the uniqueness score.

In some implementations of the computer-readable storage medium, the method may include extracting features from the first candidate image to generate a candidate image feature tensor. In some implementations of the computer-readable storage medium, the features may correspond to the first set of features extracted from each candidate image. In some implementations of the computer-readable storage medium, the method may include reducing a dimensionality of the candidate image feature tensor to generate a modified candidate image feature tensor. In some implementations of the computer-readable storage medium, determining whether the candidate image may be similar to the set of training images includes comparing the modified candidate image feature tensor with the first generative model.

In some implementations of the computer-readable storage medium, the method may include applying a weight to the features extracted from the candidate image to generate a set of weighted candidate image features. In some implementations of the computer-readable storage medium, the candidate image feature tensor may be generated based on the set of weighted candidate image features.

In some implementations of the computer-readable storage medium, the first set of features extracted from each training image may include object features. In some implementations of the computer-readable storage medium, the method may include extracting the first set of features from each training image by propagating data corresponding to each training image through at least one network including at least one of an object detection neural network, an object classification neural network, or an object recognition neural network. In some implementations of the computer-readable storage medium, the network may include an input layer, a plurality of intermediate layers, and an output layer. In some implementations of the computer-readable storage medium, the method may include extracting the first set of features from each training image by extracting outputs from at least one of the plurality of intermediate layers of the network.

In some implementations of the computer-readable storage medium, extracting the first set of features from each training image may include extracting at least one of a set of object features, a set of scene features, a set of intensity features, a set of contrast features, a set of color features, and a set of blurriness features from each training image.

In some implementations of the computer-readable storage medium, the method may include identifying respective locations of the first feature tensor and the second feature tensor in a feature space defined by the first set of features and the second set of features. In some implementations of the computer-readable storage medium, the method may include generating a visual signature for the set of training images based on the respective locations of the first feature tensor and the second feature tensor.

In some implementations of the computer-readable storage medium, the method may include selecting the set of training images based on at least one of a common author, a common origin, or a common theme.

In some implementations of the computer-readable storage medium, the method may include identifying a set of candidate images including the first candidate image. In some implementations of the computer-readable storage medium, the method may include determining, for each candidate image of the set of candidate images, whether the candidate image is similar to the set of training images based on the first candidate image and each of the first generative model and the second generative model. In some implementations of the computer-readable storage medium, the method may include identifying a subset of the set of candidate images that are similar to the set of training images.

In some implementations of the computer-readable storage medium, the method may include providing a graphical user interface to be displayed on a computing device. In some implementations of the computer-readable storage medium, the graphical user interface may display a plurality of indications corresponding to the set of candidate images. In some implementations of the computer-readable storage medium, the method may include receiving a user selection of a first indication or the plurality of indications corresponding to the first candidate image.

In some implementations of the computer-readable storage medium, the method may include identifying a brand attribute. In some implementations of the computer-readable storage medium, the method may include selecting the first set of features to be extracted from the set of training images based at least in part on the brand attribute.

In some implementations of the computer-readable storage medium, reducing the dimensionality of each first feature tensor may include applying principal component analysis to each first feature tensor to generate a first modified feature tensor for each training image.

Yet another aspect of the present disclosure relates to a system configured for evaluating images. The system may include one or more hardware processors configured by machine-readable instructions. The processor(s) may be configured to identify a first image. The processor(s) may be configured to extract a first set of features from the first image to generate a first feature tensor for the first image. The processor(s) may be configured to extract a second set of features from the first image to generate a second feature tensor for the first image. The processor(s) may be configured to identify a second image. The processor(s) may be configured to extract a third set of features from the second image to generate a third feature tensor for the second image. The processor(s) may be configured to extract a fourth set of features from the second image to generate a fourth feature tensor for the second image. The processor(s) may be configured to apply a first regression analysis to determine a first geometrical distance between the first feature tensor of the first image and the third feature tensor of the second image. The processor(s) may be configured to apply a second regression analysis to determine a second geometrical distance between the second feature tensor of the first image and the fourth feature tensor of the second image. The processor(s) may be configured to determine a similarity between the first image and the second image based on the first geometrical distance and the second geometrical distance.

In some implementations of the system, the processor(s) may be configured to calculate a similarity score representing a degree of visual similarity between the first image and the second image.

In some implementations of the system, the processor(s) may be configured to calculate a uniqueness score of the first image with respect to the second.

In some implementations of the system, calculating the uniqueness score of the first image may include calculating an inverse of the similarity score. In some implementations of the system, calculating the uniqueness score of the first image may include identifying the inverse as the uniqueness score.

In some implementations of the system, the processor(s) may be configured to reduce a dimensionality of the first feature tensor prior to applying the first regression analysis to determine the first geometrical distance between the first feature tensor of the first image and the third feature tensor of the second image.

In some implementations of the system, the processor(s) may be configured to apply a weight to the first set of features extracted from the first image to generate a set of weighted first features. In some implementations of the system, the first feature tensor may be generated based on the set of weighted first features.

In some implementations of the system, the first set of features extracted from the first image may include object features. In some implementations of the system, the processor(s) may be configured to extract the first set of features from the first image by propagating data corresponding to the first image through at least one network including at least one of an object detection neural network, an object classification neural network, or an object recognition neural network. In some implementations of the system, the network may include an input layer, a plurality of intermediate layers, and an output layer. In some implementations of the system, the processor(s) may be configured to extract the first set of features from the first image by extracting outputs from at least one of the plurality of intermediate layers of the network.

In some implementations of the system, extracting the first set of features from the first image may include extracting at least one of a set of object features, a set of scene features, a set of intensity features, a set of contrast features, a set of color features, and a set of blurriness features from the first image.

Another aspect of the present disclosure relates to a method for evaluating images. The method may include identifying a first image. The method may include extracting a first set of features from the first image to generate a first feature tensor for the first image. The method may include extracting a second set of features from the first image to generate a second feature tensor for the first image. The method may include identifying a second image. The method may include extracting a third set of features from the second image to generate a third feature tensor for the second image. The method may include extracting a fourth set of features from the second image to generate a fourth feature tensor for the second image. The method may include applying a first regression analysis to determine a first geometrical distance between the first feature tensor of the first image and the third feature tensor of the second image. The method may include applying a second regression analysis to determine a second geometrical distance between the second feature tensor of the first image and the fourth feature tensor of the second image. The method may include determining a similarity between the first image and the second image based on the first geometrical distance and the second geometrical distance.

In some implementations of the method, it may include calculating a similarity score representing a degree of visual similarity between the first image and the second image.

In some implementations of the method, it may include calculating a uniqueness score of the first image with respect to the second.

In some implementations of the method, calculating the uniqueness score of the first image may include calculating an inverse of the similarity score. In some implementations of the method, calculating the uniqueness score of the first image may include identifying the inverse as the uniqueness score.

In some implementations of the method, it may include reducing a dimensionality of the first feature tensor prior to applying the first regression analysis to determine the first geometrical distance between the first feature tensor of the first image and the third feature tensor of the second image.

In some implementations of the method, it may include applying a weight to the first set of features extracted from the first image to generate a set of weighted first features. In some implementations of the method, the first feature tensor may be generated based on the set of weighted first features.

In some implementations of the method, the first set of features extracted from the first image may include object features. In some implementations of the method, it may include extracting the first set of features from the first image by propagating data corresponding to the first image through at least one network including at least one of an object detection neural network, an object classification neural network, or an object recognition neural network. In some implementations of the method, the network may include an input layer, a plurality of intermediate layers, and an output layer. In some implementations of the method, it may include extracting the first set of features from the first image by extracting outputs from at least one of the plurality of intermediate layers of the network.

In some implementations of the method, extracting the first set of features from the first image may include extracting at least one of a set of object features, a set of scene features, a set of intensity features, a set of contrast features, a set of color features, and a set of blurriness features from the first image.

Yet another aspect of the present disclosure relates to a non-transient computer-readable storage medium having instructions embodied thereon, the instructions being executable by one or more processors to perform a method for evaluating images. The method may include identifying a first image. The method may include extracting a first set of features from the first image to generate a first feature tensor for the first image. The method may include extracting a second set of features from the first image to generate a second feature tensor for the first image. The method may include identifying a second image. The method may include extracting a third set of features from the second image to generate a third feature tensor for the second image. The method may include extracting a fourth set of features from the second image to generate a fourth feature tensor for the second image. The method may include applying a first regression analysis to determine a first geometrical distance between the first feature tensor of the first image and the third feature tensor of the second image. The method may include applying a second regression analysis to determine a second geometrical distance between the second feature tensor of the first image and the fourth feature tensor of the second image. The method may include determining a similarity between the first image and the second image based on the first geometrical distance and the second geometrical distance.

In some implementations of the computer-readable storage medium, the method may include calculating a similarity score representing a degree of visual similarity between the first image and the second image.

In some implementations of the computer-readable storage medium, the method may include calculating a uniqueness score of the first image with respect to the second.

In some implementations of the computer-readable storage medium, calculating the uniqueness score of the first image may include calculating an inverse of the similarity score. In some implementations of the computer-readable storage medium, calculating the uniqueness score of the first image may include identifying the inverse as the uniqueness score.

In some implementations of the computer-readable storage medium, the method may include reducing a dimensionality of the first feature tensor prior to applying the first regression analysis to determine the first geometrical distance between the first feature tensor of the first image and the third feature tensor of the second image.

In some implementations of the computer-readable storage medium, the method may include applying a weight to the first set of features extracted from the first image to generate a set of weighted first features. In some implementations of the computer-readable storage medium, the first feature tensor may be generated based on the set of weighted first features.

In some implementations of the computer-readable storage medium, the first set of features extracted from the first image may include object features. In some implementations of the computer-readable storage medium, the method may include extracting the first set of features from the first image by propagating data corresponding to the first image through at least one network including at least one of an object detection neural network, an object classification neural network, or an object recognition neural network. In some implementations of the computer-readable storage medium, the network may include an input layer, a plurality of intermediate layers, and an output layer. In some implementations of the computer-readable storage medium, the method may include extracting the first set of features from the first image by extracting outputs from at least one of the plurality of intermediate layers of the network.

In some implementations of the computer-readable storage medium, extracting the first set of features from the first image may include extracting at least one of a set of object features, a set of scene features, a set of intensity features, a set of contrast features, a set of color features, and a set of blurriness features from the first image.

Yet another aspect of the present disclosure relates to a method. The method may include receiving, by a computing device, a plurality of first training images; executing, by the computing device, a neural network to extract a first plurality of features from the plurality of first training images and a second plurality of features from a second training image; generating, by the computing device, a model comprising a first image performance score for each of the plurality of first training images and a feature weight for each feature of the first plurality of features, the feature weight for each feature of the first plurality of features calculated based on an impact of a variation in the feature on first image performance scores of the plurality of first training images; training, by the computing device, the model by adjusting the impact of a variation of each of a first set of features of the first plurality of features that correspond to the second plurality of features from the second training image and adding a second image performance score for the second training image to the model; executing, by the computing device, the neural network to extract a third set of features from a candidate image; executing, by the computing device, the model using the third set of features as input to generate a candidate image performance score for the candidate image; and generating, by the computing device, a record identifying the candidate image performance score for the candidate image.

In some implementations, generating the model comprises generating a distribution of the first performance scores for the plurality of first training images according to the extracted first plurality of features of the plurality of first training images.

In some implementations, executing the model using the third set of features as input causes the model to identify a subset of the first plurality of features that correspond to the third set of features; identify a set of first image performance scores that are within a distance threshold of the subset; and calculate the candidate image performance score for the candidate image based on the set of first image performance scores.

In some implementations, executing the model using the third set of features as input causes the model to calculate the candidate image performance score for the candidate image by causing the model to calculate an average of the set of first image performance scores.

In some implementations, executing the model using the third set of features as input causes the model to calculate the candidate image performance score for the candidate image comprises causing the model to calculate the average of the set of first image performance scores according to performance score weights for the set of first image performance scores.

In some implementations, executing the model using the third set of features as input causes the model to calculate the candidate image performance score for the candidate image comprises causing the model to calculate a performance score weight for a second image performance score of the set of first image performance scores according to a distance between the third set of features and a fourth set of features corresponding to the second image performance score, wherein the model calculates the average of the set of first image performance scores based at least on the performance score weight for the second image performance score.

In some implementations, executing the model using the third set of features as input causes the model to calculate the candidate image performance score for the candidate image comprises causing the model to identify feature weights for the third set of features or the fourth set of features; and calculate the distance between the third set of features and the fourth set of features as a weighted average of distance between features according to the identified feature weights.

In some implementations, the method further comprises calculating, by the computer device, a smoothness of a region comprising the second image performance score, wherein executing the model using the third set of features as input causes the model to calculate the candidate image performance score for the candidate image comprises causing the model to adjust the performance score weight for the second image performance score according to the calculated smoothness, and wherein the model calculates the average of the set of first image performance scores based at least on the performance score weight for the second image performance score by calculating the average of the set of first image performance scores based at least on the adjusted performance score weight.

In some implementations, calculating the smoothness of the region comprising the second image performance score comprises calculating one or more differences between image performance scores in the region; and calculating the smoothness of the region according to the calculated one or more differences.

In some implementations, executing the model using the third set of features as input causes the model to identify a subset of the first plurality of features that correspond to the third set of features; identify a predetermined number of image performance scores of the model closest to the subset; and calculate the candidate image performance score for the candidate image based on the predetermined number of image performance scores.

In some implementations, executing the model using the third set of features as input causes the model to identify a subset of the first plurality of features that correspond to the third set of features; calculate a first set of image performance scores that each correspond to fourth sets of features that are within a distance threshold of the subset of the first plurality of features; calculate a value based on a first size of the first set of image performance scores; identify a second set of image performance scores closest to the subset, a second size of the second set equal to the value; and calculate the candidate image performance score for the candidate image based on the second set of image performance scores.

In some implementations, training the model by adjusting the impact of a variation of each of the first set of features of the first plurality of features comprises, for a feature, calculating, by the computer device, a difference between the second image performance score and an average of a subset of first image performance scores that correspond to first training images that do not contain the feature; and adjusting, by the computer device, the impact of a variation of the feature based on the difference.

In some implementations, the method further comprises determining, by the computing device, a target audience of the plurality of first training images; assigning, by the computing device, an identifier of the target audience to the generated model; and determining, by the computing device, the second training image is of the target audience, wherein training the model with the second training image comprises training the model with the second training image responsive to determining the target audience of the second training image matches the assigned identifier of the generated model.

In some implementations, the method further comprises determining, by the computing device, the candidate image is of the target audience, wherein executing the model using the third set of features as input to generate the candidate image performance score for the candidate image comprises executing the model using the third set of features responsive to determining the target audience of the candidate image matches the assigned identifier of the generated model.

In some implementations, the method further comprises identifying, by the computing device, a subset of the first plurality of features that correspond to the third set of features; and selecting, by the computing device, one or more features of the subset responsive to the one or more features having an average feature performance score exceeding a threshold, wherein generating the record comprising the candidate image performance score for the candidate image comprises adding an identification of the one or more features to the record.

In yet another aspect, the present disclosure describes a system. The system may include one or more hardware processors configured by machine-readable instructions to receive a plurality of first training images; execute a neural network to extract a first plurality of features from the plurality of first training images and a second plurality of features from a second training image; generate a model comprising a first image performance score for each of the plurality of first training images and a feature weight for each feature of the first plurality of features, the feature weight for each feature of the first plurality of features calculated based on an impact of a variation in the feature on first image performance scores of the plurality of first training images; train the model by adjusting the impact of a variation of each of a first set of features of the first plurality of features that correspond to the second plurality of features from the second training image and adding a second image performance score for the second training image to the model; execute the neural network to extract a third set of features from a candidate image; execute the model using the third set of features as input to generate a candidate image performance score for the candidate image; and generate a record identifying the candidate image performance score for the candidate image.

In yet another aspect, the present disclosure describes a method. The method may include receiving, by a computing device, a plurality of training images; executing, by the computing device, a neural network to extract a first set of features from each of the plurality of training images; adding, by the computing device, an image performance score to the first set of features for each of the plurality of training images; generating, by the computing device, a model from the first set of features comprising the image performance score for each of the plurality of training images, the model comprising the image performance score for each of the plurality of training images according to a distribution of frequencies of features within the plurality of training images; executing, by the computing device, the neural network to extract a third set of features from a candidate image; executing, by the computing device, the model using the third set of features as input to calculate a predicted image performance score for the candidate image based on the distribution of frequencies of features; and generating, by the computing device, a record identifying the predicted image performance score for the candidate image.

In some implementations, executing the model using the third set of features as input to calculate the predicted image performance score for the candidate image causes the model to generate a line corresponding to the third set of features on the distribution of frequencies, the line comprising a plurality of points; and identify a point of the plurality of points on the line that corresponds to the predicted image performance score responsive to the point having a highest frequency of features of the plurality of points.

In some implementations, the method includes identifying, by the computing device, a feature with a frequency above a first threshold in the distribution that corresponds to a performance score above a second threshold, wherein generating the record comprises adding, by the computing device, the identified feature to the record.

In some implementations, the method may include assigning a weight to each feature of the first set of features comprising the image performance score, wherein executing the model using the third set of features as input to calculate the predicted image performance score for the candidate image causes the model to calculate the predicted image performance score based on the assigned weights.

In yet another aspect, a method is described. The method may include receiving, by a computing device, a plurality of first training images; executing, by the computing device, a neural network to extract a first plurality of features from the plurality of first training images and a second plurality of features from a second training image; generating, by the computing device, a model comprising a first image performance score for each of the plurality of first training images and a weight for each feature of the first plurality of features, the weight for each feature of the first plurality of features calculated based on a frequency of the feature within the plurality of first training images; training, by the computing device, the model by adjusting the frequency of each of a first set of features of the first plurality of features that correspond to the second plurality of features from the second training image and adding a second image performance score for the second training image to the model; executing, by the computing device, the neural network to extract a third set of features from a candidate image; executing, by the computing device, the model using the third set of features as input to generate a candidate image performance score for the candidate image; and generating, by the computing device, a record identifying the candidate image performance score for the candidate image.

In some implementations, training the model by adjusting the frequency of each of a first set of features of the first plurality of features comprises incrementing, by the computing device, a first frequency of a first feature of the first set of features; and increasing, by the computing device, a first weight of the first feature responsive to the incrementing.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
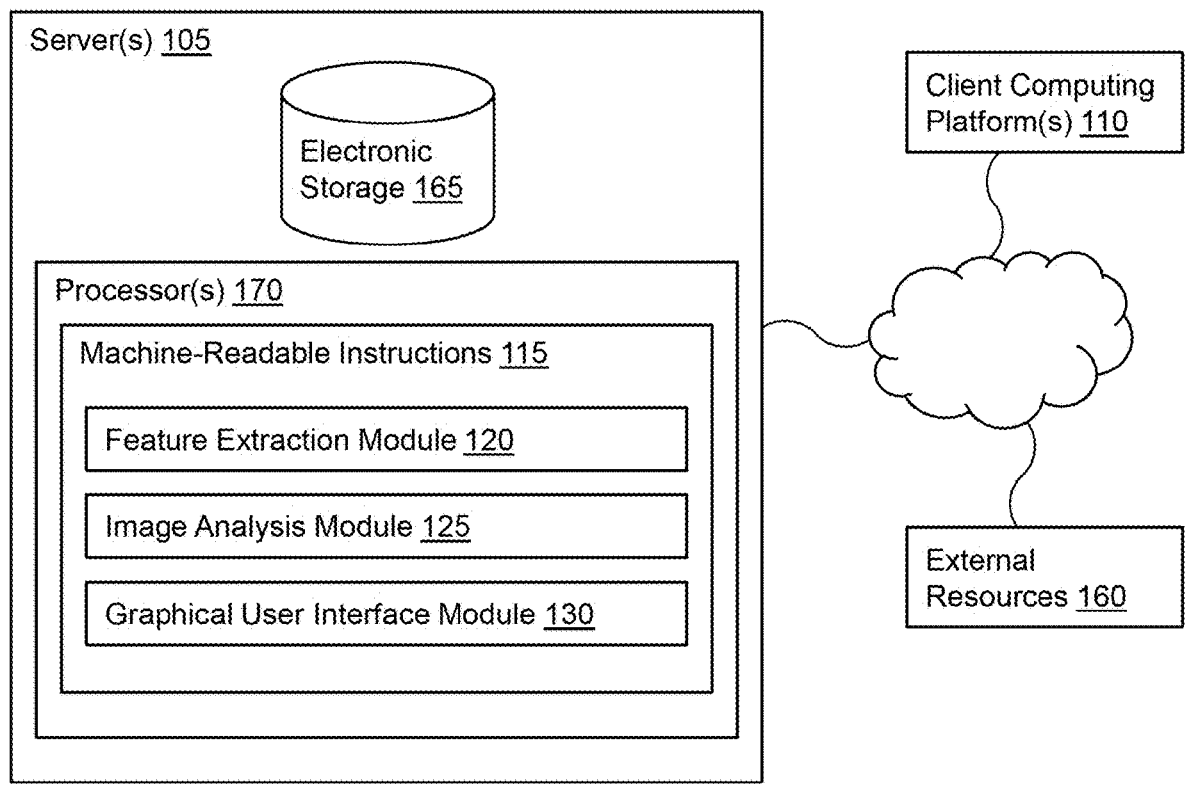
FIG. 1 illustrates a system configured for evaluating images, in accordance with one or more implementations.

Image-based content can be among the most important content posted by users to web-based or online platforms, such as social media websites and other websites. Such content can also be referred to as "creative," and can be included as part of an advertising campaign of a business, a post from an individual that contributes to the individual's online image, a graphic design composition using a software application like Photoshop, or a photograph captured via a user's camera on a mobile device. Often, users (e.g., businesses or individuals) post content items such as images that are intended to have a common theme. For example, a user may post images having similar subject matter (e.g., relating to a particular topic) or images that are intended to appeal to a group of viewers who share a particular set of demographic characteristics. Such a group can be referred to as a target audience or intended audience.

Selecting one or more images that are similar to a given set of images can be challenging. For example, a user may capture a large volume of images and store the images together on a computing device, such as within an image gallery application of a mobile phone. It can be difficult and time consuming for the user to manually evaluate each image to find a group of images that share certain characteristics, such as similarity or relevance to a common theme or subject matter.

The systems and methods described in this disclosure can implement an image evaluation mechanism which can identify a group of similar images within a database, photo gallery application, or other set of images. The systems and methods of this disclosure can also be used to identify one or more images from within a set of images that are similar to a selected candidate image. For example, various computer-implemented techniques, including artificial intelligence and machine learning algorithms, can be used to extract features from each digital image to evaluated. The feature extraction itself can make use of artificial intelligence techniques including object detection or recognition neural networks. The extracted features can then be processed using additional analytical techniques to determine a degree of similarity between the features of a candidate image and a set of other images or a degree of pairwise similarity between two candidate images.

In some implementations, features can be extracted from an image via one or more fully connected and/or convolutional layers of one or more deep learning models. Other features can be extracted via additional computational processes and from the inference results of deep learning models. The deep learning models can include models for object detection, scene detection, etc.

In some implementations, features can be represented as vectors or tensors. For example, a first set of features, such as features relating to objects, can be extracted from an image and represented as an object feature tensor. A second set of features, such as features relating to scenes, can be extracted from the image and represented as a scene feature tensor. In some implementations, any number of different feature (e.g., types of features) may be extracted from an image and represented as a respective feature tensor. This data can optionally be adjusted and the dimensionality of the resulting tensors can be reduced, for example via principal component analysis (PCA). In some implementations, reducing the dimensionality of a feature tensor can reduce the amount of data to be processed, thereby saving time and improving computational efficiency, while still allowing accurate similarity detection to be accomplished.

Feature tensors for images can be used in two separate but related processes. For example, the feature tensors can be used to calculate the similarity of two images, which may be referred to as pairwise similarity. The feature tensors also can be used to calculate a degree of similarity between one candidate image and a given set of other images, which may be referred to as set similarity. In the case of pairwise similarity, the distance between the feature tensors for each feature or attribute can be calculated and normalized. For example, two candidate images a and b, the distances are calculated using the following formula: $D1=ABS(T1a-T1b)$, $D2=ABS(T2a-T2b)$, etc., where D represents the scalar distance and T represents a feature tensor. The scalar values for the distance calculations can then be compared using a regression algorithm that can apply a respective weight to the different distances and combine them to produce a final similarity score. For example, a similarity score may be calculated using the following formula: $W1D1+W2D2+W3D3+W4D4$, etc., where W represents a respective weighting for a given feature type.

In the case of set similarity, the frequency of features in the set of images can be used to create a generative model of all such features contained in the set of images. The extracted features of a candidate image can then be compared against these generative models to determine how frequent the features in each tensor occur in the set of images used to create the generative model.

In some implementations, Similarity can be used for finding other similar social media accounts in a database, which can be then used to derive similar images to a candidate image. In some implementations, similarity results can also be introduced into an additional machine learning model to determine visually similar images that also appeal to a particular target audience.

In some implementations, similarity of images can be used to make visual recommendations to users. For example, if a user sells a particular product through a web-based store, an image of that product can be retrieved from the user's product listing and matched for similarity against one or more sets of others images that may be similar, such as images from a social media website with a theme that is relevant to the product. This can help to identify images similar to the user's product listing, but which may also be more appealing to the same audience. Then a recommendation can be made to the user suggesting that the user update the product listing to replace the original image with a new or similar image to improve performance.

In some implementations, the inverse of visual similarity can be referred to as a "uniqueness" measure. For example, uniqueness can also be used in matching accounts, or image sets, that are uniquely associated with a particular brand, product, topic, event, or theme. Uniqueness is also a measure that can be calculated for a set or in a pairwise manner for two or more images.

In some implementations, the systems and methods of this disclosure can provide an image search capability of an image database, such as a stock photo website. For example, a user may identify a copyrighted image that the user may not have permission to publish. The systems and methods of this disclosure can search an image database to find other images that are similar to the copyright protected image, but available for public use, thereby providing reverse-image search functionality. Thus, by performing similarity analysis using a set of images hosted, for example, by a free stock photo website, the systems and methods of this disclosure can identify one or more visually-similar images that are royalty-free to use. This can be highly beneficial to users searching for images that are free and open to use. Without the techniques described in this disclosure, identifying such images can be an extremely time consuming and computationally intensive process. In some implementations, the systems and methods of this disclosure can also evaluate and rank two or more candidate images identified as similar to a give image or set of images based on their appeal to one or more audiences.

In some implementations, the techniques of this disclosure can implement a similarity determination process that is adjusted for weighting certain feature types more heavily than others. For example, the systems and methods of this disclosure can determine a degree of similarity between images while giving a higher weight (e.g., a greater significance) to object-related features in the images than to other types of features. In general, any combination of features can be assigned any combination of weights. For example, in some implementations, extra weight can be given to features that may relate to similar color palettes, etc.

The subject matter described in this disclosure can be used to overcome technical challenges relating to determining set-based or pairwise similarity of images. For example, it can be difficult to determine a degree of similarity of two or more digital images based on raw image data alone, because there may not be significant meaning in the pixel-by-pixel variation of each image that relates to how the image is perceived by a human viewer. This disclosure provides technical solutions to this technical challenge. For example, this disclosure provides techniques for imitating human visual cognition by first extracting features from images, rather than relying on the raw image data to determine similarity between images. As a result, the total amount of data can be reduced relative to the raw image data, thereby allowing less computationally intensive solutions that provide a high degree of accuracy in computing similarity between images as a human viewer would perceive them. This can enable the model to run on computer hardware that does not require large amounts of memory.

It can also be a technical problem to identify and extract meaningful features from an image in an automated fashion. To address this technical challenge, in some implementations classification or detection networks can be used to extract features from an image. These types of networks can be used to classify an input image into one of a small number of states. For example, a detection network could be used to determine whether an image includes a dog (e.g., the model classifies images into two states, including one state for images that depict dogs and another state for images than do not depict dogs). Such a network may include nodes arranged in layers including an input layer, several hidden layers that form a "black box," and an output layer that provides an answer to the classification question. For many applications, the outputs of hidden layers of a classification network may not be of interest because they do not answer a classification question, and so they are often ignored. However, as described further below, the outputs of these hidden layers in a classification network that is used to process image data (e.g., an object detection network, a scene detection network, etc.) can provide useful information about features of an image that are important to human perception of the image, such as its general subject matter or theme. This disclosure describes techniques for using such information to efficiently compare two or more images to determine a degree of similarity of the images.

FIG. 1 illustrates a system 100 configured for evaluating images, in accordance with one or more implementations. In some implementations, system 100 may include one or more servers 105. Server(s) 105 may be configured to communicate with one or more client computing platforms 110 according to a client/server architecture and/or other architectures. Client computing platform(s) 110 may be configured to communicate with other client computing platforms via server(s) 105 and/or according to a peer-to-peer architecture and/or other architectures. Users may access system 100 via client computing platform(s) 110.

Server(s) 105 may be configured by machine-readable instructions 115. Machine-readable instructions 115 may include one or more instruction modules. The instruction modules may include computer program modules. The instruction modules may include one or more of a feature extraction module 120, an image analysis module 125, a graphical user interface (GUI) module 130, and/or other instruction modules.

Together, the feature extraction module 120, the image analysis module 125, the graphical user interface (GUI) module 130, and the other components of the system 100 can be configured to determine a similarity score for a candidate image and a selected set of other images. Thus, the system 100 may first gather, collect, receive, or otherwise access a set of images against which the candidate image is to be compared. The system 100 also may be configured to calculate a pairwise similarity score representing a degree of similarity for two images. The similarity score can represent a degree of similarity between the candidate image the selected set of images.

In some implementations, the image analysis module 125 may be configured to select a set of training images. The image analysis module 125 may also be configured to select the set of training images based on at least one of a common subject matter, a common author, a common origin, or a common theme. For example, the set of training images can be selected from among a set of images posted to a social media website by a particular user or author. In some implementations, the training images can be selected based on an indication that the images appeal to a particular target audience or are otherwise relevant to a particular target audience.

Feature extraction module 120 may be configured to extract a first set of features from each training image of the set of training images to generate a first feature tensor for each training image. The first set of features extracted from each training image may include object features. By way of non-limiting example, extracting the first set of features from each training image may include extracting at least one of a set of object features, a set of scene features, a set of intensity features, a set of contrast features, a set of color features, and a set of blurriness features from each training image. In some implementations, the image analysis module 125 may be configured to select a first set of features to be extracted from the set of training images based at least in part on the brand attribute, such as a font or a color scheme of a brand logo.

The feature extraction module 120 may also be configured to extract a second set of features from each training image to generate a second feature tensor for each training image. In some implementations, the feature extraction module 120 may be configured to extract the first set of features from each training image by propagating data corresponding to each training image through at least one network including at least one of an object detection neural network, an object classification neural network, or an object recognition neural network. By way of non-limiting example, the network may include an input layer, a plurality of intermediate layers, and an output layer. In some implementations, the feature extraction module 120 may be configured to extract the first set of features from each training image by extracting outputs from at least one of the plurality of intermediate layers of the network.

In some implementations, the image analysis module 125 may be configured to reduce a dimensionality of each first feature tensor to generate a first modified feature tensor for each training image. The image analysis module 125 may also be configured to reduce a dimensionality of each second feature tensor to generate a second modified feature tensor for each training image. The image analysis module 125 may also be configured to reduce a dimensionality of the candidate image feature tensor to generate a modified candidate image feature tensor. Reducing the dimensionality of each first feature tensor (or any other feature tensor) may include, for example, applying principal component analysis to each first feature tensor to generate a first modified feature tensor for each training image. Determining whether the candidate image may be similar to the set of training images can then include comparing the modified candidate image feature tensor with the first generative model. This can result in improved computational efficiency, relative to performing a comparison of the unmodified (e.g., higher dimensional) candidate image feature tensor with the first generative model.

In some implementations, the image analysis module 125 may be configured to construct a first generative model representing the first set of features and a second generative model representing the second set of features of the set of training images, based on the first modified feature tensors and the second modified feature tensors of each training image of the set of training images.

After the generative models have been constructed based on the features included in the training images, the image analysis module 125 may be configured to identify a first candidate image. For example, the candidate image can be any image whose similarity (or dissimilarity) to the training images is of interest. In some implementations, the candidate image can be provided by a user. For example, the GUI module 130 may be configured to provide a graphical user interface to be displayed on a computing device, such as the client computing platform(s) 110. The graphical user interface may display a plurality of indications, such as thumbnails or titles, corresponding to a set of candidate images. For example, the set of candidate images can be any or all of the images stored in a photo gallery application on the computing device. In some implementations, the GUI module 130 may be configured to receive a user selection of a first indication or the plurality of indications corresponding to the selected candidate image whose degree of similarity to the training images is of interest.

In some implementations, there may be a set of candidate images, all of whom are to be evaluated with respect to the training set of images. For example, the image analysis module 125 may be configured to identify the set of candidate images including the first candidate image. The image analysis module 125 may be configured to determine, for each candidate image of the set of candidate images, whether the candidate image is similar to the set of training images based on the first candidate image and each of the first generative model and the second generative model. The image analysis module 125 may also be configured to identify a subset of the set of candidate images that are similar to the set of training images. For example, the image analysis module 125 may be configured to apply a regression algorithm to the first candidate image and each of the first generative model and the second generative model to determine whether the first candidate image is similar to the set of training images.

Image analysis module 125 may be configured to calculate a similarity score representing a degree of visual similarity between the first candidate image and the set of training images, based on the regression algorithm. In some implementations, the image analysis module 125 may also be configured to calculate a uniqueness score of the first candidate image with respect to the set of training images. For example, calculating the uniqueness score of the first candidate image may include calculating an inverse of the similarity score. In some implementations, the image analysis module 125 can identify the inverse as the uniqueness score.

In some implementations, the feature extraction module 120 may be configured to extract features from the first candidate image to generate a candidate image feature tensor. The features may correspond to the first set of features extracted from each candidate image. The image analysis module 125 may also be configured to apply a weight to the features extracted from the candidate image to generate a set of weighted candidate image features. The candidate image feature tensor may be generated based on the set of weighted candidate image features. In some implementations, the weighting of the features can instead be applied directly to each candidate image before the features are extracted, rather than applied to the feature tensors.

In some implementations, the image analysis module 125 may be configured to identify respective locations of the first feature tensor and the second feature tensor in a feature space defined by the first set of features and the second set of features. The image analysis module 125 may also be configured to generate a visual signature for the set of training images based on the respective locations of the first feature tensor and the second feature tensor. For example, a visual signature can include metadata relating to the content of a visual fingerprint. A visual fingerprint can be a representation of a single image derived from the feature extraction processes described above. The visual fingerprint can indicate the important attributes of a single image and can help to distinguish and compare individual images against one another. The visual fingerprint of individual images collectively can enable a similarity classifier, which may be a similarity score.

The visual signature can be derived from all the visual fingerprints of an image collection. For example, the visual signature can be or can represent an overall distribution of visual fingerprints for a collection of images. For example, this can be derived from a user's image library, where the visual fingerprints of the images in the user's library are used to generate an overall signature for that user's library. That signature can in turn be used as a metric to compare one user's image library against another user's image library to determine how similar those image libraries are. Thus, analysis can be conducted upon visual fingerprints in a visual signature (e.g. similarity scores for similarity classifiers, clustering of feature tensor locations in multidimensional space, performance scores, labels, etc.) This can provide a means of generating a surface match for any query of a visual signature. In some implementations, additional analysis can also be conducted using the original fingerprints from which the visual signature was derived.

In some implementations, the system 100 may be configured to calculate a pairwise similarity score representing a degree of similarity for two images, rather than a set-based similarity for a candidate image as described above. For example, the image analysis module 125 may be configured to identify a first image and a second image whose degree similarity to one another is of interest. In some implementations, the feature extraction module 120 may be configured to extract a first set of features from the first image to generate a first feature tensor for the first image. The first set of features extracted from the first image may include object features. By way of non-limiting example, extracting the first set of features from the first image may include extracting at least one of a set of object features, a set of scene features, a set of intensity features, a set of contrast features, a set of color features, and a set of blurriness features from the first image. The feature extraction module 120 may also be configured to extract a second set of features from the first image to generate a second feature tensor for the first image.

In some implementations, the feature extraction module 120 may be configured to extract a third set of features from the second image to generate a third feature tensor for the second image. The feature extraction module 120 may also be configured to extract a fourth set of features from the second image to generate a fourth feature tensor for the second image.

In some implementations, the feature extraction module 120 may be configured to extract the first set of features from the first image by propagating data corresponding to the first image through at least one network including at least one of an object detection neural network, an object classification neural network, or an object recognition neural network. By way of non-limiting example, the network may include an input layer, a plurality of intermediate layers, and an output layer. The feature extraction module 120 may be configured to extract the first set of features from the first image by extracting outputs from at least one of the plurality of intermediate layers of the network.

In some implementations, the image analysis module 125 may be configured to apply a first regression analysis to determine a first geometrical distance between the first feature tensor of the first image and the third feature tensor of the second image. The image analysis module 125 may also be configured to apply a second regression analysis to determine a second geometrical distance between the second feature tensor of the first image and the fourth feature tensor of the second image.

In some implementations, the image analysis module 125 may be configured to determine a similarity between the first image and the second image based on the first geometrical distance and the second geometrical distance. Image analysis module 125 may be configured to calculate a similarity score representing a degree of visual similarity between the first image and the second image. In some implementations, the image analysis module 125 may be configured to calculate a uniqueness score of the first image with respect to the second. Calculating the uniqueness score of the first image may include calculating an inverse of the similarity score. For example, the image analysis module 125 may identify the inverse as the uniqueness score.

In some implementations, the image analysis module 125 may be configured to reduce a dimensionality of the first feature tensor prior to applying the first regression analysis to determine the first geometrical distance between the first feature tensor of the first image and the third feature tensor of the second image. In some implementations, the image analysis module 125 may be configured to apply a weight to the first set of features extracted from the first image to generate a set of weighted first features. The first feature tensor may be generated based on the set of weighted first features.

Figure 2:
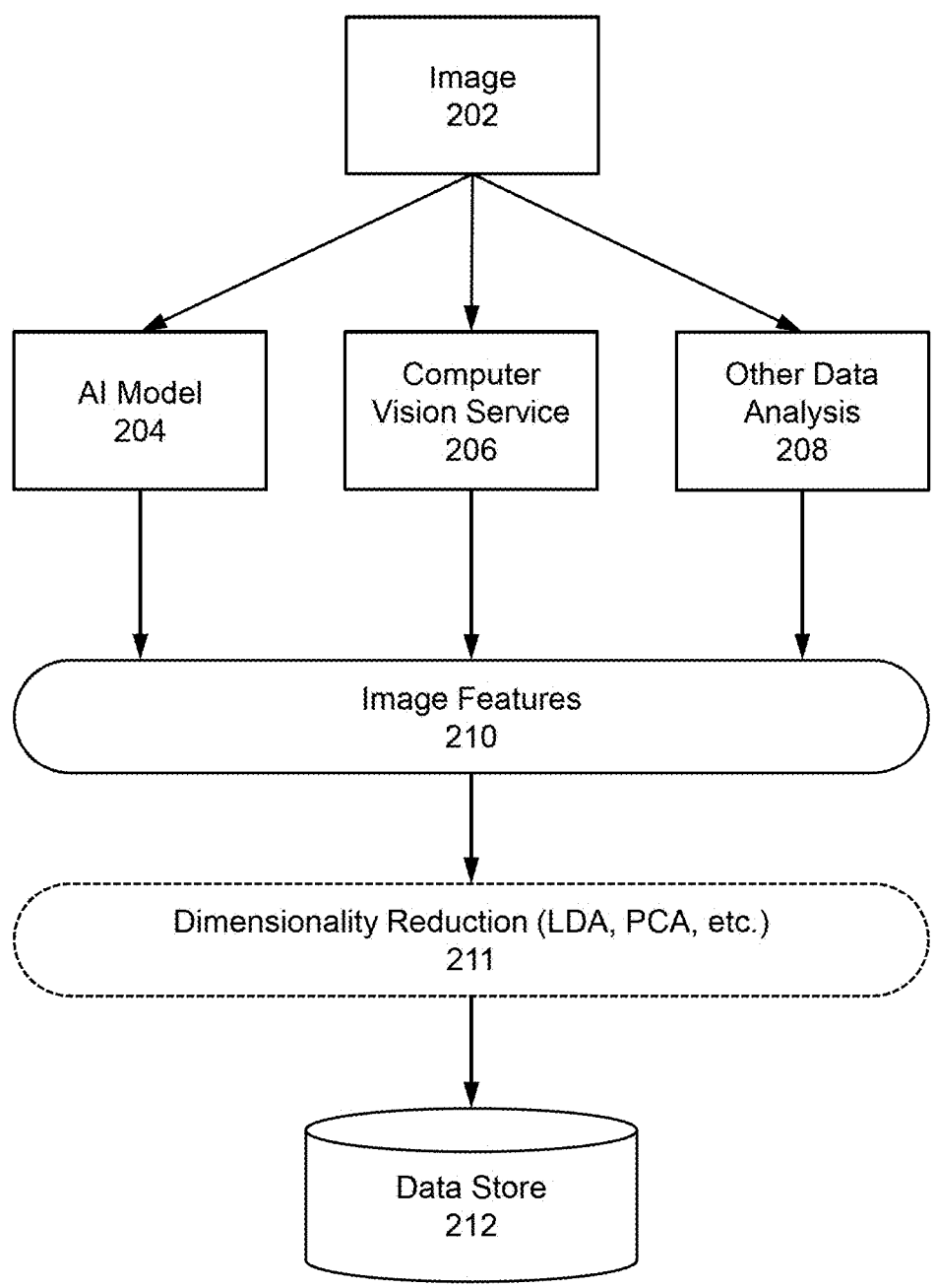
FIG. 2 illustrates data flow in a process for extracting features from images, in accordance with one or more implementations.

FIGS. 2-6 depict processes for extracting features from images, constructing a generative model, and using the generative model to determine a similarity score for a candidate image with respect to a set of training images or with respect to a single second image. The processes depicted in FIGS. 2-6 can be implemented, for example, by the server 102 of FIG. 1. Thus, FIGS. 2-6 are described below with reference also to FIG. 1. Referring now to FIG. 2, data flow in a process for extracting features from images is illustrated, in accordance with one or more implementations. The process 200 can be performed, for example, by the feature extraction module 120 of FIG. 1. It should be understood that, while FIG. 2 shows feature extraction for a single image 202, the process 200 can be repeated for any number of images included in a set of images, such as images in a database or photo gallery application. The process 200 can include using one or more artificial intelligence models 204, one or more computer vision services 206, and other data analysis techniques 208 to extract features from the image 202.

In some implementations, the feature extraction module 120 can implement the one or more artificial intelligence models 204, the one or more computer vision services 206, and the other data analysis techniques 208. For example, the one or more artificial intelligence models 204, the one or more computer vision services 206, and the other data analysis techniques 208 can each include an artificial neural network that includes nodes arranged in a plurality of layers. Each node can be a computational unit, which may also be referred to as an artificial neuron. The layers can be arranged sequentially such that a node receives an input signal from one or more of the nodes in the previous layer, processes the input according to a function to produce an output, and transmits the output to one or more nodes of the next layer. The first layer of such a network can be referred to as an input layer, and can receive the raw image data (e.g., data corresponding to each individual pixel of the image 202). The final layer can be referred to as an output layer. Thus, the image data for the image 202 can be propagated through the layers of an artificial neural network to cause the artificial neural network to produce one or more outputs at each layer of the artificial network, including the final or output layer.

In some implementations, any of the one or more artificial intelligence models 204, the one or more computer vision services 206, and the other data analysis techniques 208 can be a detection network. For example, a detection network can be configured to determine a presence or absence of one or more predetermined characteristics of the image 202, such as the features of a scene depicted in the image 202, the features of objects depicted in the image 202, a color or colors most prevalent in the image 202, etc. Each such network can be used to extract a respective set of image features 210 from the image 202. Thus, a scene detection network can be used to extract a set of scene features from the image 202, an object detection network can be used to extract a set of object features from the image 202, etc.

In some implementations, the feature extraction module 120 can use the outputs of an intermediate layer of an artificial neural network corresponding to any of the one or more artificial intelligence models 204, the one or more computer vision services 206, and the other data analysis techniques 208. An intermediate layer can be any layer between the input layer and the output layer. Thus, while a detection network may have an output layer that outputs a binary signal (e.g., indicating presence or absence of a particular trait in the image 202), the outputs of intermediate layers also can be relevant to image features 210 in the image 202. In some implementations, these intermediate outputs can be mathematically descriptive of the image 202 itself. In some implementations, the feature extraction module 120 can extract the image features 210 based on the outputs of an intermediate layer of an artificial neural network (e.g., any of the one or more artificial intelligence models 204, the one or more computer vision services 206, and the other data analysis techniques 208), which may be represented as a vector, a tensor, or any other form of information.

The image features 210 that can be extracted from the image 202 by the feature extraction module 120 are not limited to object, scene, or color features. For example, the features extracted from the image 202 can be or can include any stylistic features that may relate to any visual characteristic of an image, such as layout, position, symmetry, balance, arrangement, composition, pixel intensity, contrast, blurriness, object location, depth of field, angle of view, focal point, view point, vantage point, foreground/background content, white space/negative space, cropping, framing, color scheme, hue, tint, temperature, tone, saturation, brightness, shade, mood, line, angles, noise, contours, gradients, texture, repetition, patterns, blowout, blooming, concentricity, cubic attributes, geometric attributes, shadow, blocked shadow, vignetting, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only, and should be not read as limiting the scope of this disclosure.

Other types of features of the images in the training dataset also can be extracted from the image 202. It should be understood that while the image features 210 are depicted as a single entity in FIG. 2 for illustrative purposes, in some implementations separate sets of image features 210 may be extracted by each of the one or more artificial intelligence models 204, the one or more computer vision services 206, and the other data analysis techniques 208. The image feature manager 110 can process these separate sets of features, for example by altering a format of the feature sets or combining the feature sets, to produce the image features 210. In some implementations, the image features 210 can be represented mathematically as one or more feature tensors. For example, a respective feature tensor can be generated for each of one or more feature types for the image 202. In some implementations, the process 200 can include reducing a dimensionality of one or more feature tensors or other data structures used to implement the image features 210. For example, dimensionality can be reduced by applying an analytical technique such as principal component analysis to one or more of the tensors or other data structures used to represent the image features 210. In some implementations, reducing the dimensionality can help to reduce the overall size of the image features 210. The feature extraction module 120 can store the image features 210 in a data store 212. In some implementations, the data store 212 can correspond to electronic storage 165 of FIG. 2.

Figure 3:
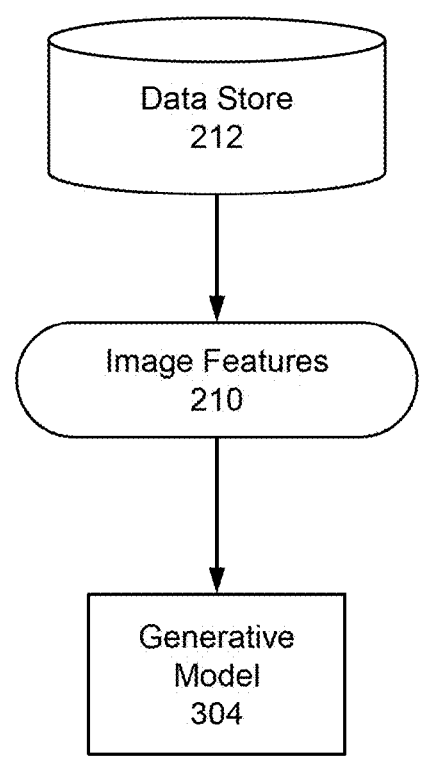
FIGS. 3 and 4 illustrate data flow in a process for constructing a generative model, in accordance with one or more implementations.
Figure 4:
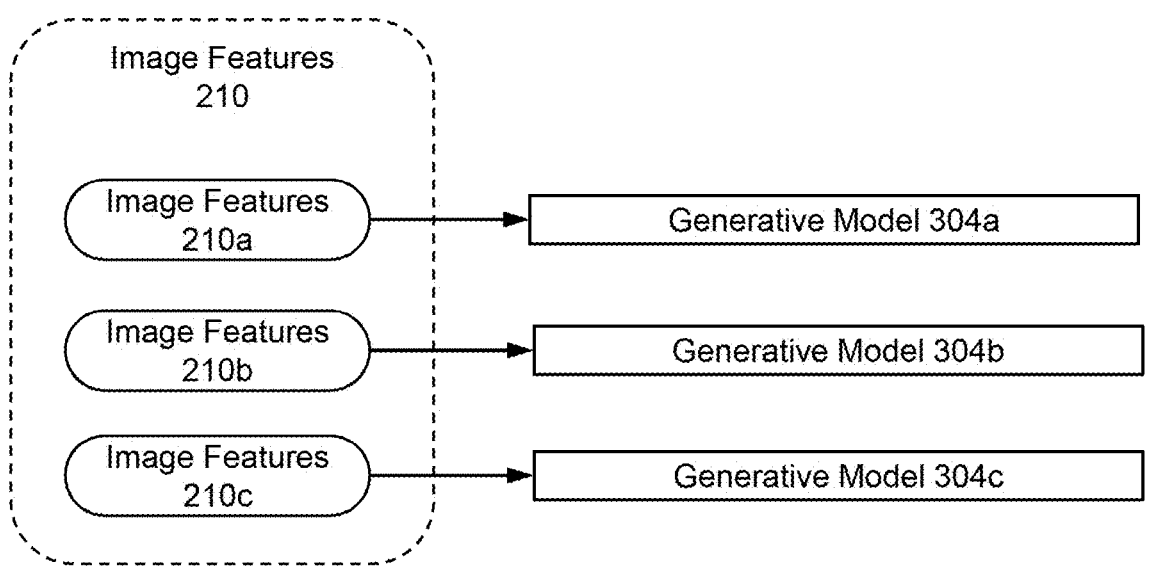

FIGS. 3 and 4 illustrate data flow in a process for constructing a generative model, in accordance with one or more implementations. Additional, fewer, or different operations may be performed in process 300 and process 400. The process 300 of FIG. 3 and the process 400 of FIG. 4 can make use of the image features 210 extracted in the process 200 of FIG. 2. For example, as shown in FIG. 3, the image features 210 can be retrieved from the data store 212 and processed, manipulated, or otherwise used to construct a generative model 304. In some implementations, the generative model can be a mathematical model (e.g., data stored in one or more data structures) that represents the distribution of image features 210 within the image 202. For example, in some implementations, the generative model can be a mathematical model that represents the joint probability distribution of image features 210 within the image 202.

In some implementations, more than one generative model may be produced. For example, as shown in the process 400 of FIG. 4, multiple generative models 304a-304c can be produced based on the set of image features 210. As shown, the image features 210 can be divided into subsets of image features 210a, 210b, and 210c. Generally, the subsets of image features 210a, 210b, and 210c can be non-overlapping with one another. In some implementations, the subsets of image features 210a, 210b, and 210c can be grouped according to categories or types of features, such as object features, scene features, color features, etc. Thus, each subset 210a, 210b, and 210c of the image features 210 can be represented as a respective tensor that contains information about one type or category of features included in the image features 210. In some implementations, a respective generative model 304a, 304b, and 304c can be constructed, based on each of the subsets 210a, 210b, and 210c of the image features 210. Thus, the generative model 304a can represent the distribution of the subset of image features 210a, the generative model 304b can represent the distribution of the subset of image features 210b, and the generative model 304c can represent the distribution of the subset of image features 210c. In some implementations, the generative models 304a-304c can be combined into a single generative model 304.

FIGS. 3 and 4 show the general approach for propagating image features 210 for a single image 202 through the layers of the machine learning model 304 in order to train the model. It should be appreciated that these processes may be repeated with image features 210 from the other images 202 in the set of training images, to produce one or more generative models 304 for each image in the set of training images.

Figure 5:
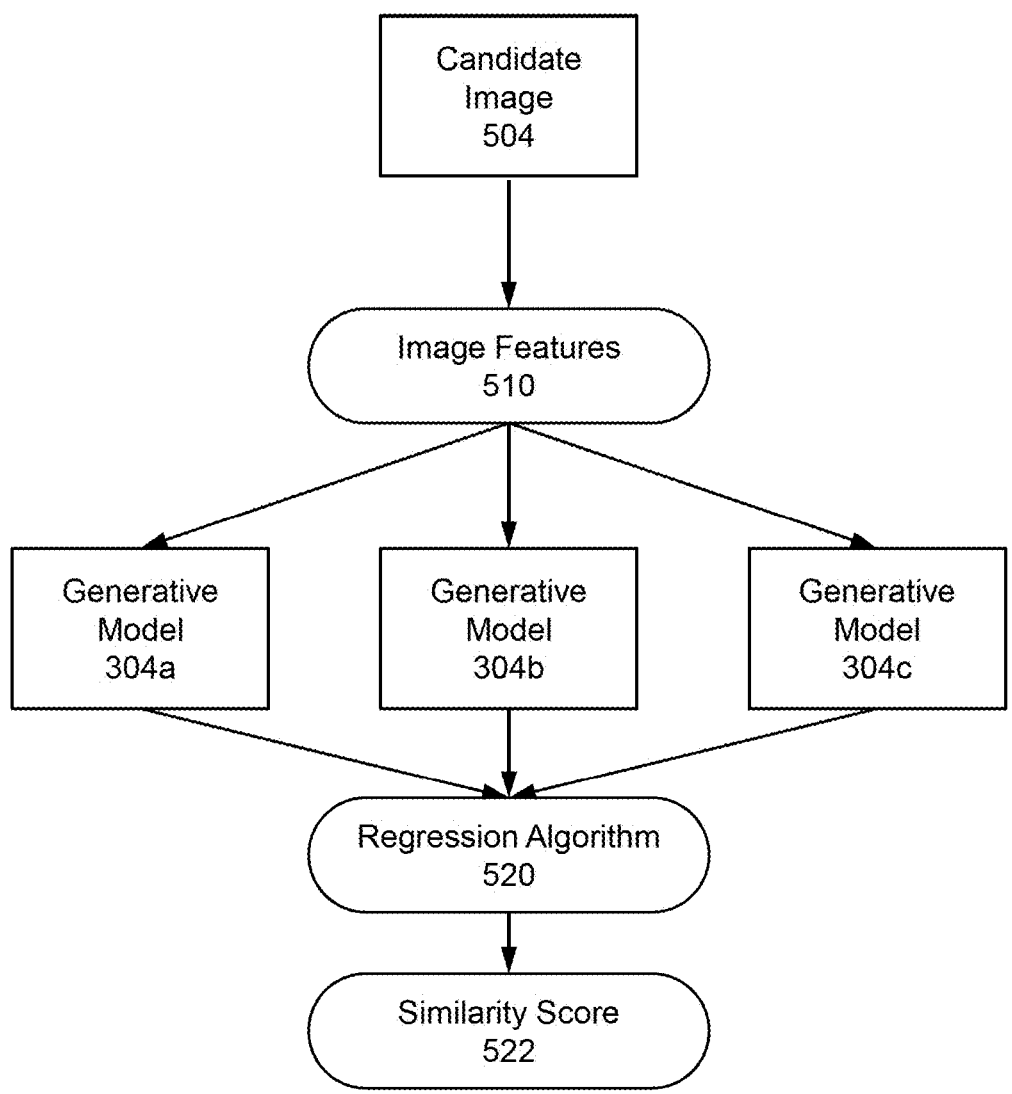
FIG. 5 illustrates data flow in a process for generating a similarity score for an image, in accordance with one or more implementations.

FIG. 5 illustrates data flow in a process 500 for generating a similarity score for a candidate image 504, in accordance with one or more implementations. Additional, fewer, or different operations may be performed in process 500. In some implementations, the process 500 can be performed by the image analysis module 125 of FIG. 1. The process 500 can make use of the one or more generative models 304 that has been constructed for each image in the set of training images according to the processes 300 and 400 shown in FIGS. 3 and 4, respectively. The candidate image 504 can be any image whose similarity to the set of training images is of interest. For example, a user of one of the client computing devices 104 may submit the candidate image 504 for a similarity determination. In some implementations, a user may submit more than one candidate image 504 and each candidate image 504 can be scored separately to determine its similarity with respect to the set of training images, using the process 500.

In some implementations, data flow for scoring the candidate image 504 can be similar to data flow for constructing the generative model 304 with each training image. For example, a set of image features 510 can be extracted from the candidate image 504. In some implementations, the image features 510 can be extracted from the candidate image 504 using the same or similar techniques described above for extracting the image features 210 from an image 202. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks. In some implementations, dimensionality of one or more feature tensors included in the image features 510 can be reduced using techniques similar to those described above.

The problem of calculating a degree of similarity between the candidate image 504 and the set of training images can be a regression problem. For example, a regression algorithm 520 can be used to compare the image features 510 of the candidate image with each of the generative models 304a, 304b, and 304c for the images included in the training set. Thus, the image analysis module 125 can be configured to apply the regression algorithm 520 to compare feature tensors included in the image features 510 of the candidate image with the corresponding generative models 304a representing the training images. In some implementations, the regression algorithm 520 can be used to compute a distance (e.g., a geometric distance in a space defined by the image features 510) between the image features 510 of the candidate image and the image features 210 of each training image (as represented by the generative models 304a, 304b, and 304c). The image analysis module 125 can calculate a similarity score 522 based on the results of the regression algorithm 520. For example, if the regression algorithm 520 indicates that the image features 510 are relatively close to the generative models 304a, 304b, and 304c, the image analysis module 125 can calculate a similarity score 522 indicating that the candidate image 504 is relatively similar to the set of training images. If the regression algorithm 520 indicates that the image features 510 are relatively far from the generative models 304a, 304b, and 304c, the image analysis module 125 can calculate a similarity score 522 indicating that the candidate image 504 is relatively dissimilar to the set of training images. In some implementations, the similarity score can be a numerical value. For example, the similarity score may be an integer between zero and 100, or a decimal value between 0 and 1.

Figure 6:
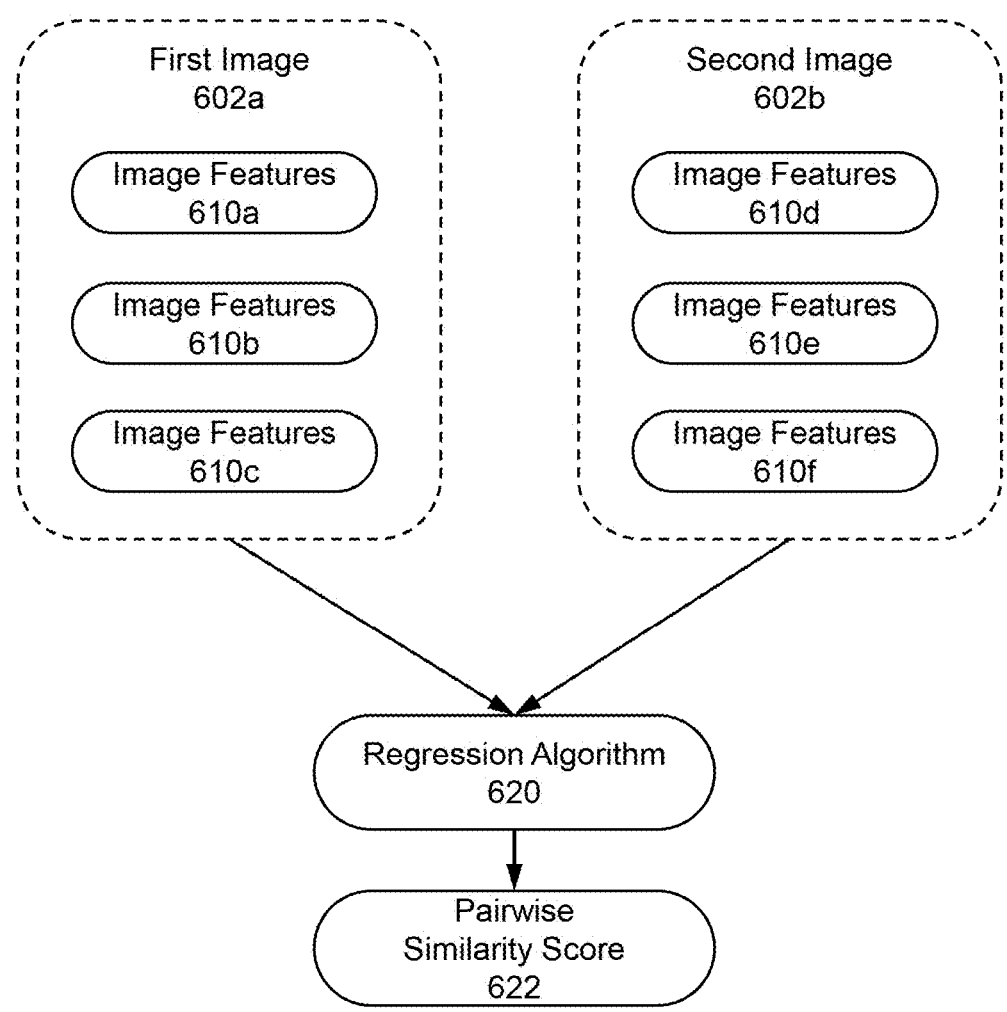
FIG. 6 illustrates data flow in a process for generating a similarity score for an image, in accordance with one or more implementations.

FIG. 6 illustrates data flow in a process 600 for generating a similarity score for an image, in accordance with one or more implementations. Additional, fewer, or different operations may be performed in process 600. In some implementations, the process 600 can be performed by the image analysis module 125 of FIG. 1. The process 600 can be used to compute pairwise similarity between a first image 602a and a second image 602b. This differs from the process 500 in that the process 500 is used to compute set similarity (i.e., similarity of a candidate image with respect to a set of training images) rather than pairwise similarity (i.e., a degree of similarity between two candidate images). The first image 602a and the second image 602b can be any images whose similarity to one another is of interest. For example, a user of one of the client computing devices 104 may submit the first image 602a and the second image 602b a similarity determination.

In some implementations, data flow for determining similarity between the first image 602a and the second image 602b can be similar to data flow for constructing the generative model 304 with each training image as described above in FIGS. 2-4. For example, a set of image features can be extracted from each of the first image 602a and the second image 602b. In some implementations, multiple sets of images can be extracted from each of the first image 602a and the second image 602b. For example, as shown in FIG. 6, three sets of image features (labeled 610a-610c) can be extracted from the first image 602a, and three sets of image features (labeled 610d-610f) can be extracted from the second image 602b. In some implementations, the image features 510 can be extracted from the candidate image 504 using the same or similar techniques described above for extracting the image features 210 from an image 202. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks.

In some implementations, the image features 610a-610c can be represented as tensors. The dimensionality of one or more of these feature tensors can be reduced using techniques similar to those described above. In some implementations, the image features 610a-610c can be feature types or categories that correspond to the types of categories of image features 610d-610f, respectively. This can facilitate comparison of pairs of the image features 610a-610d via the regression algorithm 620. For example, the image features 610a of the first image 602a can be compared to the image features 610d of the second image 602b, the image features 610b of the first image 602a can be compared to the image features 610e of the second image 602b, and the image features 610c of the first image 602a can be compared to the image features 610f of the second image 602b.

Similar to the calculation of the similarity score 522 as shown in FIG. 5, the calculation of the pairwise similarity score 622 can be a regression problem. For example, the regression algorithm 620 can be used to compare the image features 610a-610b of the first image 602a with the image features 610c-610f, respectively, of the second image 602b. Thus, the image analysis module 125 can be configured to apply the regression algorithm 620 to compare feature tensors included in the image features 610 of the first image 602a with the corresponding image features 610 of the second image 602b. In some implementations, the regression algorithm 620 can be used to compute a distance (e.g., a geometric distance in a space defined by the image features 610) between the feature tensors included in the image features 610 of the first image 602a with the corresponding image features 610 of the second image 602b. The image analysis module 125 can calculate a pairwise similarity score 622 based on the results of the regression algorithm 620. For example, if the regression algorithm 620 indicates that the image features 610a-610c are relatively close to the image features 610d-610f, the image analysis module 125 can calculate a pairwise similarity score 622 indicating that the first image 602a is relatively similar to the second image 602b. If the regression algorithm 620 indicates that the image features 610a-610c are relatively far from the image features 610d-610f, the image analysis module 125 can calculate a pairwise similarity score 622 indicating that the first image 602a is relatively dissimilar from the second image 602b.

In some implementations, the similarity score can be a numerical value. For example, the pairwise similarity score 622 may be an integer between zero and 100, or a decimal value between 0 and 1. In some implementations, the image analysis module 125 can apply a normalization technique when calculating the pairwise similarity score 622. For example, the normalization technique can make use of a set of parameters that may be selected based on the feature types of the features 610a-610f. In some implementations, a pairwise similarity score 622 near zero may indicate a relatively high degree of similarity between the first image 602a and the second image 602b, while a pairwise similarity score 622 near 1 may indicate a relatively low degree of similarity between the first image 602a and the second image 602b.

In some implementations, the normalization technique for pairwise similarity can rely on two parameters, including an upper bound and a lower bound for the distance between the same feature tensor for the first image 602a and the second image 602b images. The value of the distance can then be normalized using the following equation: (distance between the two tensors−lower bound)/(upper bound−lower bound). In some implementations, the results can be clipped at 0 and 1, so that any distance values lower than the lower bound are set to 0 and distance higher than the upper bound are set to 1. In this example, a lower score can indicate that the first image 602a and the second image 602b are more similar for a given feature tensor, and a higher score can indicate less similarity for that feature. The upper and lower bounds can be determined, for example, by evaluating feature tensors for a large number of images for each feature.

In some implementations, server(s) 105, client computing platform(s) 110, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 105, client computing platform(s) 110, and/or external resources 160 may be operatively linked via some other communication media.

A given client computing platform 110 may include one or more processors configured to execute computer program modules. The computer program modules may be configured to enable an expert or user associated with the given client computing platform 110 to interface with system 100 and/or external resources 160, and/or provide other functionality attributed herein to client computing platform(s) 110. By way of non-limiting example, the given client computing platform 110 may include one or more of a desktop computer, a laptop computer, a handheld computer, a tablet computing platform, a NetBook, a Smartphone, a gaming console, and/or other computing platforms.

External resources 160 may include sources of information outside of system 100, external entities participating with system 100, and/or other resources. In some implementations, some or all of the functionality attributed herein to external resources 160 may be provided by resources included in system 100.

Server(s) 105 may include electronic storage 165, one or more processors 170, and/or other components. Server(s) 105 may include communication lines, or ports to enable the exchange of information with a network and/or other computing platforms. Illustration of server(s) 105 in FIG. 1 is not intended to be limiting. Server(s) 105 may include a plurality of hardware, software, and/or firmware components operating together to provide the functionality attributed herein to server(s) 105. For example, server(s) 105 may be implemented by a cloud of computing platforms operating together as server(s) 105.

Electronic storage 165 may comprise non-transitory storage media that electronically stores information. The electronic storage media of electronic storage 165 may include one or both of system storage that is provided integrally (i.e., substantially non-removable) with server(s) 105 and/or removable storage that is removably connectable to server(s) 105 via, for example, a port (e.g., a USB port, a firewire port, etc.) or a drive (e.g., a disk drive, etc.). Electronic storage 165 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 165 may include one or more virtual storage resources (e.g., cloud storage, a virtual private network, and/or other virtual storage resources). Electronic storage 165 may store software algorithms, information determined by processor(s) 170, information received from server(s) 105, information received from client computing platform(s) 110, and/or other information that enables server(s) 105 to function as described herein.

Processor(s) 170 may be configured to provide information processing capabilities in server(s) 105. As such, processor(s) 170 may include one or more of a digital processor, an analog processor, a digital circuit designed to process information, an analog circuit designed to process information, a state machine, and/or other mechanisms for electronically processing information. Although processor(s) 170 is shown in FIG. 1 as a single entity, this is for illustrative purposes only. In some implementations, processor(s) 170 may include a plurality of processing units. These processing units may be physically located within the same device, or processor(s) 170 may represent processing functionality of a plurality of devices operating in coordination. Processor(s) 170 may be configured to execute modules 120, 125, and 130, and/or other modules. Processor(s) 170 may be configured to execute modules 120, 125, and 130, and/or 205, and/or other modules by software; hardware; firmware; some combination of software, hardware, and/or firmware; and/or other mechanisms for configuring processing capabilities on processor(s) 170. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 120, 125, and 130 are illustrated in FIG. 1 as being implemented within a single processing unit, in implementations in which processor(s) 170 includes multiple processing units, one or more of modules 120, 125, and 130 may be implemented remotely from the other modules. The description of the functionality provided by the different modules 120, 125, and 130 described below is for illustrative purposes, and is not intended to be limiting, as any of modules 120, 125, and 130 may provide more or less functionality than is described. For example, one or more of modules 120, 125, and 130 may be eliminated, and some or all of its functionality may be provided by other ones of modules 120, 125, and 130. As another example, processor(s) 170 may be configured to execute one or more additional modules that may perform some or all of the functionality attributed below to one of modules 120, 125, and 130.

Figure 7:
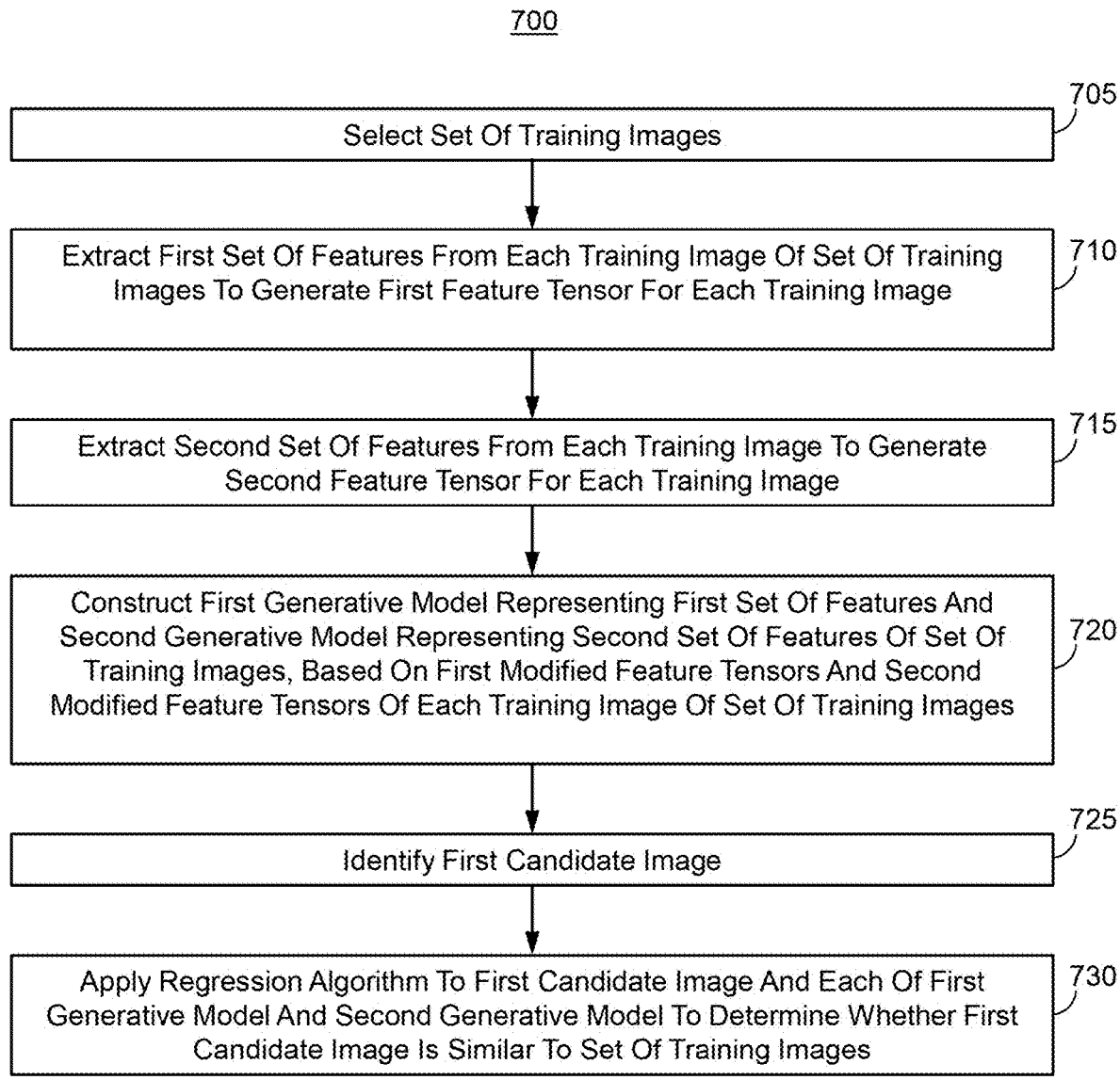
FIG. 7 illustrates a method for evaluating images, in accordance with one or more implementations.

FIG. 7 illustrates a method 700 for evaluating images, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

In some implementations, the method 700 can be used to determine a degree of similarity between a candidate image and a set of training images. An operation 705 may include selecting a set of training images. Operation 705 may be performed by one or more hardware processors configured by machine-readable instructions including the machine-readable instructions 115 and/or any of the modules implemented by the machine-readable instructions 115, in accordance with one or more implementations.

An operation 710 may include extracting a first set of features from each training image of the set of training images to generate a first feature tensor for each training image. Operation 710 may be performed by one or more hardware processors configured by machine-readable instructions including a module that is the same as or similar to feature extraction module 120, in accordance with one or more implementations.

An operation 715 may include extracting a second set of features from each training image to generate a second feature tensor for each training image. Operation 715 may be performed by one or more hardware processors configured by machine-readable instructions including a module that is the same as or similar to feature extraction module 120, in accordance with one or more implementations.

In some implementations, the method 700 may optionally include reducing a dimensionality of each first feature tensor to generate a first modified feature tensor for each training image. For example, dimensionality reduction of each first feature tensor may be performed by one or more hardware processors configured by machine-readable instructions including a module that is the same as or similar to image analysis module 125, in accordance with one or more implementations.

In some implementations, the method 700 may include reducing a dimensionality of each second feature tensor to generate a second modified feature tensor for each training image. For example, dimensionality reduction of each second feature tensor may be performed by one or more hardware processors configured by machine-readable instructions including a module that is the same as or similar to image analysis module 125, in accordance with one or more implementations.

An operation 720 may include constructing a first generative model representing the first set of features and a second generative model representing the second set of features of the set of training images, based on the first modified feature tensors and the second modified feature tensors of each training image of the set of training images. Operation 720 may be performed by one or more hardware processors configured by machine-readable instructions including a module that is the same as or similar to image analysis module 125, in accordance with one or more implementations.

An operation 725 may include identifying a first candidate image. Operation 725 may be performed by one or more hardware processors configured by machine-readable instructions including a module that is the same as or similar to image analysis module 125, in accordance with one or more implementations.

An operation 730 may include applying a regression algorithm to the first candidate image and each of the first generative model and the second generative model to determine whether the first candidate image is similar to the set of training images. Operation 730 may be performed by one or more hardware processors configured by machine-readable instructions including a module that is the same as or similar to image analysis module 125, in accordance with one or more implementations.

Figure 8:
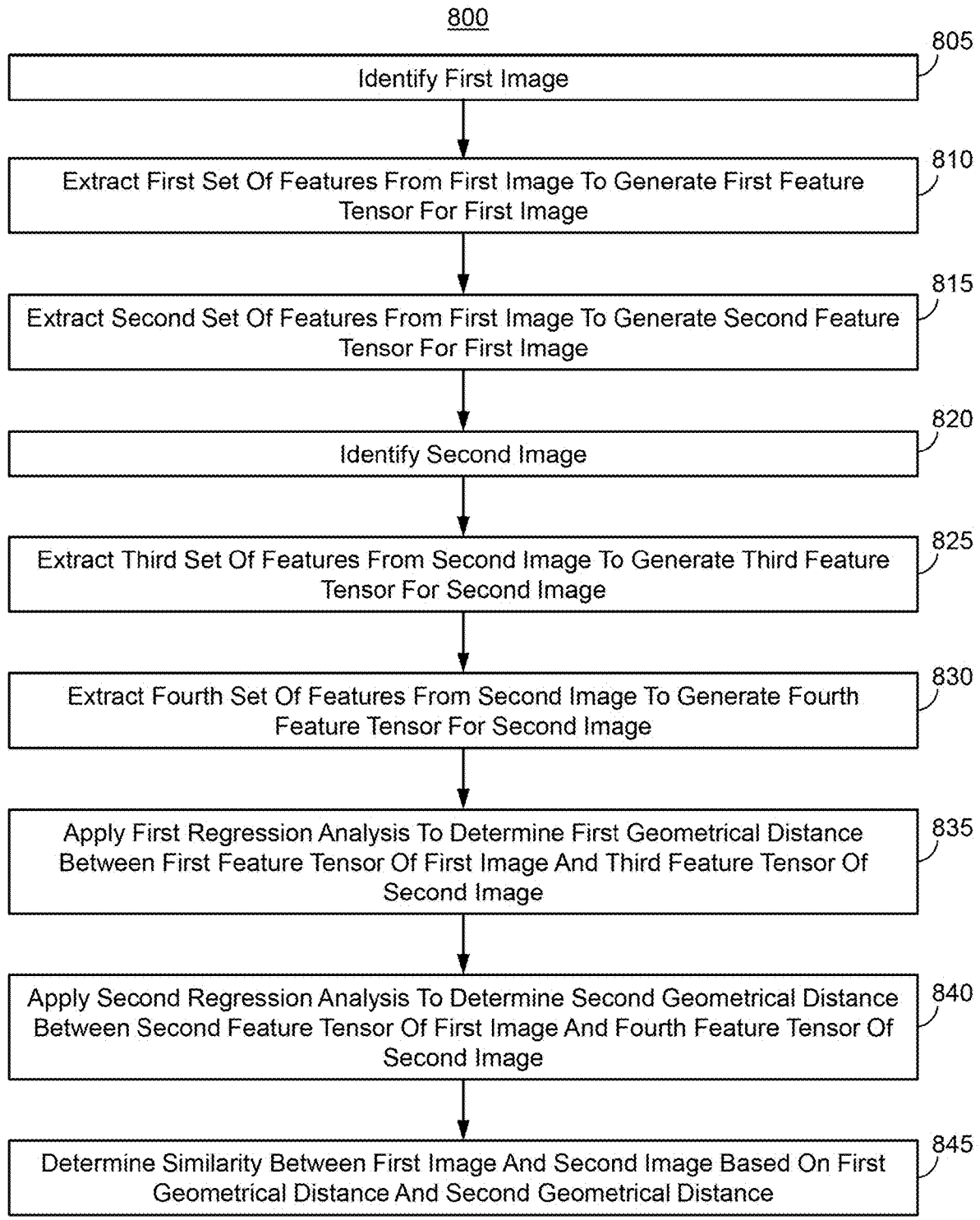
FIG. 8 illustrates a method for evaluating images, in accordance with one or more implementations.

FIG. 8 illustrates a method 800 for evaluating images, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

In some implementations, the method 800 can be used to determine a degree of similarity between a first image and a second image. An operation 805 may include identifying a first image. Operation 805 may be performed by one or more hardware processors configured by machine-readable instructions including a module that is the same as or similar to image identifying module 120, in accordance with one or more implementations.

An operation 810 may include extracting a first set of features from the first image to generate a first feature tensor for the first image. Operation 810 may be performed by one or more hardware processors configured by machine-readable instructions including a module that is the same as or similar to feature extraction module 120, in accordance with one or more implementations.

An operation 815 may include extracting a second set of features from the first image to generate a second feature tensor for the first image. Operation 815 may be performed by one or more hardware processors configured by machine-readable instructions including a module that is the same as or similar to feature extraction module 120, in accordance with one or more implementations.

An operation 820 may include identifying a second image. Operation 820 may be performed by one or more hardware processors configured by machine-readable instructions including a module that is the same as or similar to image identifying module 120, in accordance with one or more implementations.

An operation 825 may include extracting a third set of features from the second image to generate a third feature tensor for the second image. Operation 825 may be performed by one or more hardware processors configured by machine-readable instructions including a module that is the same as or similar to feature extraction module 120, in accordance with one or more implementations.

An operation 830 may include extracting a fourth set of features from the second image to generate a fourth feature tensor for the second image. Operation 830 may be performed by one or more hardware processors configured by machine-readable instructions including a module that is the same as or similar to feature extraction module 120, in accordance with one or more implementations.

An operation 835 may include applying a first regression analysis to determine a first geometrical distance between the first feature tensor of the first image and the third feature tensor of the second image. Operation 835 may be performed by one or more hardware processors configured by machine-readable instructions including a module that is the same as or similar to regression analysis applying module 130, in accordance with one or more implementations.

An operation 840 may include applying a second regression analysis to determine a second geometrical distance between the second feature tensor of the first image and the fourth feature tensor of the second image. Operation 840 may be performed by one or more hardware processors configured by machine-readable instructions including a module that is the same as or similar to regression analysis applying module 130, in accordance with one or more implementations.

An operation 845 may include determining a similarity between the first image and the second image based on the first geometrical distance and the second geometrical distance. Operation 845 may be performed by one or more hardware processors configured by machine-readable instructions including a module that is the same as or similar to similarity determination module 135, in accordance with one or more implementations.

The technology described in this disclosure for determining set-based or pairwise similarity of digital images can be implemented for a variety of purposes. For example, in an image search application, similarity scores based on visual content items can be used to find similar content items automatically to provide users with more relevant results. The approach described herein, which examines features of a variety of digital images, can allow such searches to be performed without requiring any other labels or referencing other metadata of the images. Thus, unlabeled digital images can be searched efficiently.

In a related example, image similarity can be leveraged to power new content recommendations that can be delivered to an end user. For example, on a web-based storefront product listing page, a user may wish to find a better lifestyle image to publish to make the user's products appear more visually engaging. The technology described in this disclosure can take this input image and look for the nearest matches across one or more data stores. For example, the recommended imagery could have a provenance on a stock photo site. Alternatively, a recommended image could be in a folder stored on the user's computer (e.g., in a photo gallery application executed by the computer), or it could be in a cloud-based digital asset management system or other content library, social media account, etc.

In some implementations, the technology described herein can allow a visual signature to be generated for a set of one or more images. Visual similarity provides a means to generate a visual signature for a user based upon the images in the user's photo gallery, or in a given collection of images associated with the user. For example, by selecting a set of images associated with a user and determining a visual signature of the selected set, the visual signature can also be associated with the user. Similarly, the visual signature can be associated with a website or other web-based property, an author, a social media account, etc., simply by selecting the set of images from the web-based property, the author, the social media account and determining a visual signature based on the selected set of images. The visual signature can be a unique identifier of the user and can enable comparison of one user against another user to find a visual match (e.g., visual signatures that are similar to one another, or near to one another geometrically in a space defined by features that were used to generate the visual signatures). This is advantageous because it eliminates any need to review any demographic or personal identifiable information about the users to create these such a pairing. It enables a new user graph (e.g., a social network) that can be powered by the visual connectedness between users and groups of users.

In a similar example, the similarity technology can be used as a preprocessing step before computing an identity calculation, which can be based on the visual signature of images captured by, stored by, owned by, or otherwise associated with a user. That is, the technology described herein can be used as a content classifier to find all images relating to a common theme, such as travel-related photos in the user's photo gallery application.

The visual similarity technology described herein can also be applied in the context of determining whether a given image is a "fit" with a user's chosen or preferred identity, "brand look," or other creative requirements of a user or brand. For example, a brand may have a logo that includes a distinctive green color as part of its brand identity. In their marketing and advertising promotions, this color can therefore be emphasized to build familiarity among potential customers and reinforce associations with the brand with end consumers. In an illustrative example, the technology described herein can be used to evaluate the visual features of a representative sample of imagery for the brand, and can compare new candidate images to this sample set based on their visual similarity to the brand attributes. In that way, images that may not have the same green color (or a certain prominence of green color, etc.) may be identified as visually dissimilar and therefore classified as more likely to be off-brand. For example, "off-brand" images may be inappropriate for use due to potential confusion caused by inconsistent themes in messaging.

The visual similarity technology described herein can also be an extremely efficient means to compile training sets for a particular image-based classification problem. For example, if a user wishes to build a classifier on "apple orchards," the user can submit one or more images of an apple orchard to the systems and methods of this disclosure can analyze the constituent visual features of the apple orchard seed image(s) and use these features as a basis for automatically identifying visually-similar images. This can be used to identify a set of visually similar images that can be used to train a new machine learning model, for example, without requiring the traditional heavily-manual human curation process.

In a related example, the technology described herein can be made available as a self-service option to users. With this technology, users advantageously do not need to have any deep learning or data science experience to build a dataset. For example, the system can do this work for them—they need only define the parameters on which they would like a custom content classifier to be generated. In some implementations, a user can access a system providing this functionality, such as the server 105, via a network connection to the user's computing device, such as the client computing platform 110 as shown in FIG. 1.

The technology described in this disclosure can also be utilized to generate predicted business outcomes of visual material. For example, consider a social media post where the return on investment (ROI) of taking a new photo is measured by a number of "likes" earned by the post. Given a candidate image, the technology described herein can be used to identify the most visually similar contents that have been previously posted, with respect to the candidate image. Each of these historical contents can be associated with a number of Likes. The visual similarity technology described herein can be used to evaluate the features of the candidate image with these other images (either published by the user, or e.g. published by other users, such as a competitor) and then based upon a visual similarity match to the contents that have been tagged with performance information, the technology described herein can be used to impute a predicted range of Likes for the candidate image. This is useful because it provides users with a predictive return on investment of their photo selections prior to putting them into market. This same approach can be leveraged with other forms of visual media such as advertisements, coupons, packaging designs, displays, website images, etc.

In a related example, users can select one or more images from a collection (e.g. on a mobile phone photo gallery application) to customize the content they wish to study. These selections can be used to inform subsequent contents that are shown to or flagged for the user. Advantageously, a user's selections can also form the basis for smart albums that automatically populate themselves with new contents. For example, if a user selects five images containing beer-related images the system can use these images as the reference set for identifying new images that "visually fit" with the beer-related contents. In that way, the next time a user takes a photo that relates to beer, the photo can be automatically tagged and classified into the album with visually-similar material. These albums can also be generated automatically on-device based on visual similarity without the user's customization if desired.

In another related example, the task of retrieving visually-similar content items can be performed by the end user. For example, if a user selects an image, clicks in image, or otherwise 'chooses' one or more images displayed in a photo gallery application, the technology described herein can be used to retrieve or "summon" other images that are visually similar to the user's selection. For example, the retrieved images can be based on the similarity scores with respect to the images selected by the user. Such a feature can be advantageous to quickly find the images that a user is are looking for in a disorganized space, such as photo gallery application. Visual similarity therefore enables a new suite of content management and curation features that improve user experience and enable the discoverability of new and relevant content.

Training and Implementing an Image Evaluation Model

Image evaluation is a computer technology for evaluating images to determine how those images will perform with individual target audiences (e.g., how many interactions the individual images will generate on the Internet from member of a target audience). For example, systems that evaluate images may evaluate images using an image-by-image approach, only taking into account one feature within each image at a time. For instance, a computer may determine scores for images using a naïve approach in which the computer uses a neural network to identify the most dominant subject matter within different images and identify the number of interactions the images with the different types of dominant subject matter generate on the Internet. In some cases, the computer may identify the dominant subject matter in the images by maintaining a list in a database with different levels of dominance and compare the extracted features to the list to identify the feature of the image with the highest level of dominance. The computer may then identify the dominant subject matter of the images that had the most online interactions and generate a recommendation to include the dominant subject matter in future online images.

In one example, a computer may evaluate the amount of online interactions of three pictures, a picture that includes a bear, a picture that includes a monkey, and a picture that includes a rhinoceros. The computer may determine the three animals are dominant from the pictures based on a stored list indicating the animals have a high dominance level. The computer may identify the picture of the bear as receiving the most online selections and use the presence of a bear in an image as the basis for determining the amount of engagement (e.g., number of interactions (e.g., such as clicks, likes, comments, shares, etc.)) other images will receive online. Accordingly, upon receiving a new image, the computer will extract the features from the image and determine if a bear is included in the image. The computer would then determine a predicted amount of engagement for the image based on whether the image includes a bear.

However, the reliance on the dominant features in images may cause the computer to suffer from the inability to robustly determine predicted engagement for images that have a complex web of different features that may affect their engagement. While a single image may have a dominant feature that typically does not receive a significant amount of online engagement, there may be many other features, or visual cues, in the image besides the dominant feature that affect the image's engagement. For example, while a rhinoceros may typically correspond to a low level of engagement, a rhinoceros in a bright colorful environment may correspond to a high level of engagement. A computer that only determines engagement for an image based on the presence of a rhino may be substantially inaccurate because the computer may miss important nuances in images beyond the presence and/or absence of high-level objects. Such a computer may further not have a model in place that may "learn" over time as individuals' image preferences change.

Computer systems may also face other technical challenges in determining how an image will perform compared with other images. For example, a computer that implements dominant feature-based predictions may lack the capability to make image scoring predictions based on combinations of features, where some features of an input image are positive and others are negative. This may lead to the computer not being able to discriminate between images that contain similar features. In another example, a computer may not be able to account for trends over time. For instance, preferences for features in images may change over time. A computer implementing the dominant feature-based approach may not account for an increasing pool of features that may affect how the image will perform. In yet another example, a computer implementing the dominant feature-based approach may lack the capability to identify specific positive and/or negative drivers of performance of an input image based on specific features or combinations of features.

A computer implementing the systems and methods described herein may overcome the aforementioned technical challenges by generating and training models to calculate image performance scores for images according to patterns of features within the images. Image performance scores may be scores indicating a likelihood that users (in some cases of a particular target audience) will interact with (e.g., click, like, comment, share, view, etc.) or otherwise engage with the image. The performance score may otherwise be a value associated with an image. As described herein, an image performance score may also be referred to as a performance score or a score. In one example, a computer may extract features from a large number of training images. By extracting the features, the computer may compile a large diversity of extracted features from images that were previously scored (e.g., had previously been assigned a performance score). The computer may then generate a model from the extracted features that includes a distribution of the extracted features within the training images as well as the performance scores that correspond to the images and/or features. The computer may periodically update the model over time by adding features and performance scores for new images to the model.

Upon generating and/or sufficiently training the model, the computer may execute the model to calculate a performance score for a candidate image (e.g., a new unscored image). To do so, the computer may use a neural network to extract features from the candidate image. The computer may use the same neural network to extract features from the candidate image that the computer used to extract features from the training images to ensure compatibility of the extracted features with the model. The computer may then input the extracted features into the model and execute the model. Executing the model may cause the model to compare the features against a distribution of the features from the training images and performance scores of the training images. In performing the comparison, the model may calculate a performance score for the candidate image based on the performance scores of training images that contain similar features. By comparing the candidate image against a distribution of training images and scores for the training images, the computer may account for nuances and patterns in the images for which other computer systems cannot account to calculate an image performance score for the candidate image.

One example of a model that the computer can generate and/or use to calculate a performance score for an image is a modified k-nearest neighbor model. For instance, using extracted features from the training images, the computer may fit a generative model. The model may include data about the density of the occurrence of different image features within the set of training images. The model may determine if any peaks in the model (e.g., features that have a high frequency or a frequency above a threshold) correspond to high or low scores (if the average score of the images within the peak is high or low). The computer may use such peaks to identify the features that can drive the score high or low to generate recommendations indicating different causes of performance fluctuation between images. To predict a score for a candidate image, the model may identify a point within the model that corresponds to features extracted from the candidate image, identify a predetermined number of points or all points within a distance threshold of the identified point (e.g., identify the neighbors of the candidate image), and calculate an average or weighted average of the identified points. In this way, the model may predict a performance score of an image based on the similarity of features of the candidate image to features of the pre-scored training images.

In some cases, to improve the accuracy of the model's predictions, the computer may assign weights to the performance scores that correspond to the images that were used to train the model. The computer may assign weights to the performance scores by calculating a smoothness of the region or regions in which the performance scores are located (e.g., the region of performance scores that contain the same or similar features). The smoothness may indicate a variation in performance scores between the images in a region. The computer may assign higher weights to performance scores in regions with a higher smoothness because performance scores in such regions may be more reliable or have a higher predictive value. The computer may then use the weights to calculate more accurate image performance scores for new images.

In some cases, to further improve the accuracy of the model's predictions, the computer may assign weights to individual features of the model. The computer may assign the weights based on a correlation between the respective features and the effect that variations in the features have on the performance score of an image. For example, the computer may calculate the effect that variations in a feature may have on an image performance score by calculating an average of image performance scores of images that contain the feature. The computer may also calculate an average of image performance scores of images that do not contain the feature. The computer may compare the two averages to calculate a difference in the averages to determine an impact that variations in a feature may have on image performance scores. The model may use the calculated impact to weight the features when determining the distance between a candidate image and the stored training images. By doing so, the model may identify images that are the most similar in the features that most affect the performance score of the candidate image, thus enabling the model to generate a more accurate image performance score for the candidate image.

Another example of a generated model that the computer can use to calculate a performance score for an image involves using a distribution of features of the set of training images in which the performance scores for the images are included in the features. For example, after extracting the features from the set of training images, the computer may add (e.g., concatenate) the performance scores for the images to the sets of extracted features. The computer may then generate the model by modeling a distribution of sets of features including the added performance scores. In some embodiments, the model may be a Gaussian Mixture Model in which each feature, including the performance score feature, has its own axis. The distribution may illustrate the confidence of the model in a performance score based on the frequency or density of the features that correspond to the performance score. Higher densities within the distributions may represent the confident regions. Moving along the performance score axis of the model toward higher scores, the peaks that exist in the higher scoring regions indicate areas in which the model may be confident that the features that correspond to the region would positively impact a performance score for an image.

When predicting the score for a new image using the distribution of features and performance scores, the model may generate a line on the distribution without a value for a performance score. The model may predict a score for the new image by identifying a point on the line where the highest peak exists (e.g., where the probability or confidence score for the image performance score is the highest). To improve a score, the computer may analyze any single dimension or multiple dimensions in the distribution to identify features or combinations of features that correspond to high probabilities of high performance scores. The computer may recommend or automatically transform an image to include the high performing features and thus improve the score for the image. Accordingly, by modeling the distribution of features within the training data set, the computer can 1) predict the confidence of the scores, 2) model the patterns of behavior in higher dimensions (evaluate more sets of features) and learn from details in the data, and 3) specify the dimensions contributing to confident results in the high scoring regions.

In one example, a model may include a high density of image samples in a region where the score is high, the images are all dark, and are portraits of a person smiling. Different images may have other features that are not consistent for different samples (e.g., portraits of people from different ages, genders, or different angles or sizes of the face). The computer may identify the high density and determine that smiles as well as darkness are positive factors, but other features in the image may not be as impactful. After making this determination, the model may receive extracted features from a new image, such as a portrait of a person in a white background with no visible emotion. To improve the score for this image, the computer may recommend adding smiling or darkness features to the image such that the image would get closer to the peak in the high scoring region. In this way, the computer may generate instructions and/or transformations on which features to include in images such that the images include high performance scores.

In some embodiments, to help the distribution-based model focus more on the features that differentiate the score, the model may implement a feature reduction technique on the feature set. For example, the distribution-based model may weight the features of the distribution according to the importance of the features. In doing so, the distribution-based model may weight the performance score higher or the highest of the features of the distribution. Accordingly, by emphasizing the performance score feature, the model may more accurately distinguish between high and low performing features.

This technical solution takes into account nuances in visual cues and creates a distribution of those visual cues' performance. For example, a distribution of visual cues may include data on a large number of features of images that are most commonly occurring and are correlated with positive performance scores as well as features that are least commonly occurring and are correlated with negative or low performance scores. Some of these features may be objects, other features can be more descriptive in nature, such as "camping scene" or "chic" or "Active." In some cases, the features may be precise measurements such as the dominant RGB value of an image, a set of RGB values, a distribution of RGB values, a lighting value, a contrast value, etc. These features and a large number of other features may only be interpreted by a computer, such as those contained in the feature embedding of an object recognition deep learning model.

An advantage to implementing either of the two aforementioned types of models to determine performance scores for images is that new features may be added to the models over time (e.g., the model may be tuned over time). For example, after initially training a model, a computer may add training data from 100 more images that may include new features not in the initial training data set. In doing so, the model may perform a more sophisticated comparison between an image's elements and another image's elements. This has the effect of improving the overall scoring accuracy of a new input image whose features are "matched" against the combined data contained in the distribution.

Figure 9A:
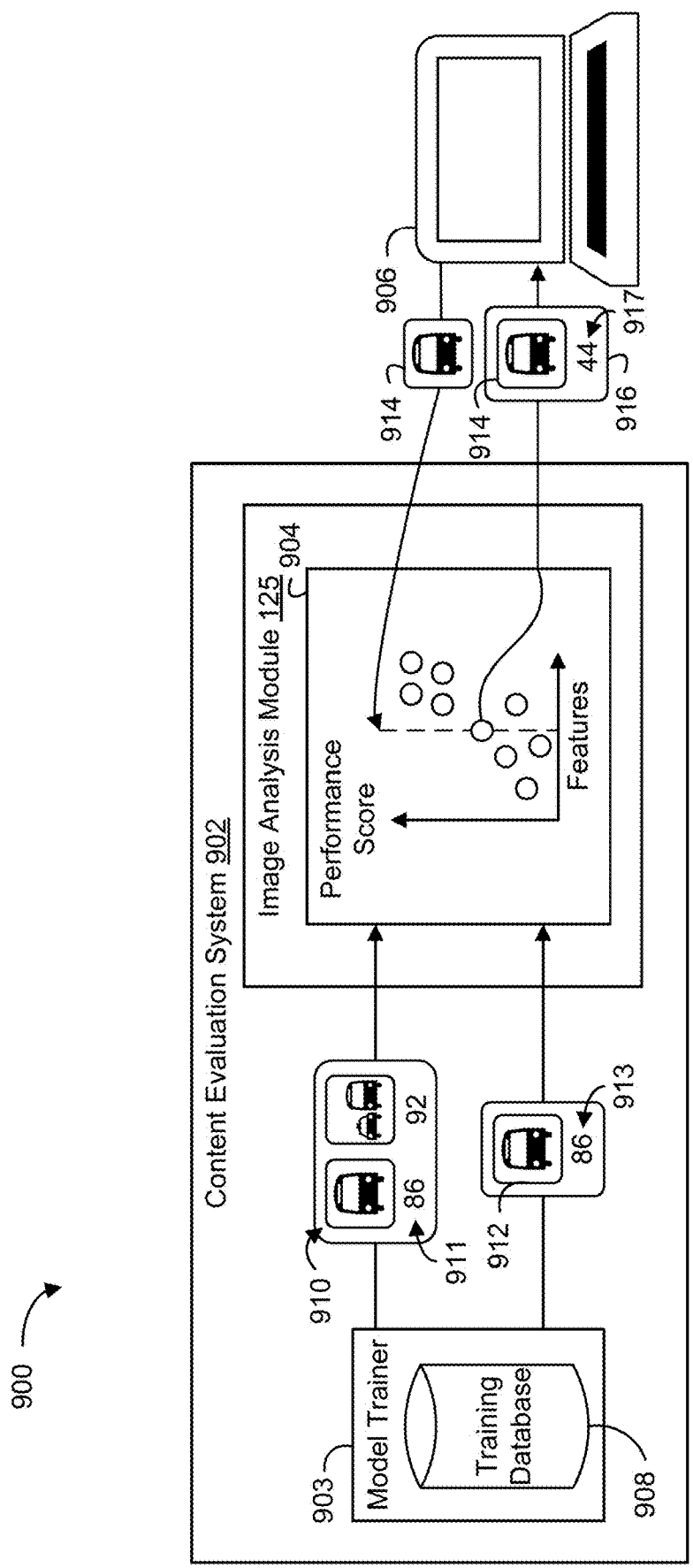
FIGS. 9A and 9B illustrate sequences for training and implementing a model for image evaluation, in accordance with one or more implementations.

FIG. 9A illustrates a sequence 900 for training and implementing a model for image evaluation, in accordance with one or more implementations. The sequence 900 may be performed by a content evaluation system 902. The content evaluation system 902 may include a processor and a memory and may be the same as or similar to the server(s) 105, shown and described with reference to FIG. 1. In brief overview, in the sequence 900, the content evaluation system 902 may execute a model trainer 903 to generate and/or train a model 904 that can be executed by the image analysis module 125. Via the model trainer 903, the content evaluation system 902 may generate the model 904 such that the model 904 may calculate image performance scores for new images based on a distribution of performance scores from training images that contain similar features to the new images. Upon generating the model 904, the image analysis module 125 may execute the model 904 to calculate performance scores for new images, such as upon receiving a request for such image performance scores from a computing device 906. The computing device 906 may be the same as or similar to the client computing platform(s) 110, shown and described with reference to FIG. 1.

The model trainer 903 may comprise programmable instructions that, upon execution, cause the content evaluation system 902 to generate and/or train the model 904 to calculate image performance scores for images. The model trainer 903 may receive a plurality of training images 910. In addition to the plurality of training images, the model trainer 903 may receive image performance scores 911 that correspond to the training images. The model trainer 903 may receive the performance scores 911 in the same manner as the training images 910 The training images 910 may be images the model trainer 903 stores and/or retrieves from a training database 908 of images that the model trainer 903 may use to train or generate the model 904 to calculate image performance scores for images. In some embodiments, the training database 908 of images may be stored locally in memory of the content evaluation system 902. In such embodiments, the model trainer 903 may receive the plurality of training images 910 by retrieving the training images 910 from the training database 908. In some embodiments, the training database 908 may be stored in memory of an external or remote computing device. In such embodiments, the model trainer 903 may retrieve the training images 910 by sending a request for the training images 910 to the external or remote computing device. The model trainer 903 may store and/or retrieve the training images 910 in any manner.

In some embodiments, the model trainer 903 may retrieve and/or select the training images 910 that correspond to a specific target audience. As described herein, a target audience may be a type of users that share a common interest (e.g., favorite sports) or characteristic (e.g., age). The training database 908 may store target audience identifiers with images that are associated with users of the particular target audience (e.g., images that are typically viewed and/or interacted with by users of the target audience). In embodiments in which the model trainer 903 stores images in a local database, the model trainer 903 may retrieve images from the local database that correspond to a target audience by querying the database using an identifier of the target audience and retrieving images that are associated with a matching target audience identifier. In embodiments in which the model trainer 903 retrieves images from a remote database, the model trainer 903 may include an identifier of the target audience in a request for images and the computer storing the remote database may perform a similar query. By retrieving images that correspond to a specific target audience, the model trainer 903 may use the images to generate and/or train the model 904 to calculate performance scores for images for that specific target audience (e.g., calculate predicted amounts of interaction members of the target audience will have with different images).

The model trainer 903 (in some cases via the feature extraction module 120) executes a neural network to extract features from the received training images 910. For example, the model trainer 903 may input a training image into a neural network (e.g., a feature extraction neural network). The neural network may be trained to automatically extract features from the training image. Such features may be or may include descriptors of the training image such as identifications of objects within the training image, colors within the training image, scenery within the training image, shades of colors within the training image, etc. The model trainer 903 may execute the neural network with the training image and output values for the different features, thus extracting features from the training image. The model trainer 903 may format the extracted features into a feature vector for the training image by setting the values for the extracted at different index values of the vector. The model trainer 903 may similarly extract features for each of the received training images 910. In this way, the model trainer 903 may extract a plurality of features from the plurality of training images 910 in a format that the model trainer 903 may use to generate and/or train the model 904 to calculate image performance scores for images. The model trainer 903 may use such a neural network or any other feature extraction technique to extract features from images.

In some embodiments, the model trainer 903 may assign performance scores to sets of features that were each extracted from different training images. For example, the model trainer 903 may organize the features that were extracted from each training image into a vector comprising a set of features that were extracted from the training image. The model trainer 903 may assign or label the set with an image performance score 911 that indicates the image performance score that corresponds to the training image from which the set of features was extracted. The image performance score 911 may have been input by a user or administrator or pre-calculated using other methods. The model trainer 903 may similarly assign performance scores to sets of features for different training images to create sets of data that the model trainer 903 may use to generate the model 904 to calculate image performance scores for new unlabeled images.

The model trainer 903 generates the model 904. The model trainer 903 may generate the model from the sets of features of the training images and/or the performance scores the model trainer 903 assigned or labeled to the sets of features. For example, when generating the model 904, the model trainer 903 may generate a distribution of image performance scores according to the features of the images that correspond to the image performance scores. The model trainer 903 may generate the distribution as a multi-dimensional graph in which each feature the model trainer 903 extracted from the plurality of training images 910 corresponds to an axis in the graph (e.g., one axis may indicate whether an image includes a dog, another axis may indicate whether an image includes multiple people, etc.). The axes in the graph may be binary (e.g., indicate whether an image includes a feature or not) or non-binary (e.g., indicate a level of a feature such as an RGB value of an image or a count of a specific feature such as a number of animals in the image). The distribution may include an axis for performance scores in addition to axes for the different features. The model trainer 903 may generate the distribution by plotting the image performance scores in the graph according to the features of the images that correspond to the image performance scores. Accordingly, the model trainer 903 may generate the model 904 to illustrate a comparison of image performance scores with the features that correspond to the image performance scores.

The model trainer 903 calculates impacts of the different features. The impact may be an impact that a variation (e.g., a change) in a feature may have on an image performance score for an image. The model trainer 903 may calculate the impact of variations in a feature in a few manners. For example, for a binary feature (e.g., a feature that an image has or does not have) the model trainer 903 may calculate the impact of a variation in a feature by first identifying and calculating a first average of image performance scores of a set of training images that contain the feature and a second average of image performance scores of a set of training images that do not contain the feature. The model trainer 903 may calculate the variance as the difference between the two averages. In another example, for a non-binary feature (e.g., a feature that an image may have different levels of), the model trainer 903 may calculate the impact of a variance as an average incremental change between the different levels of the feature. The model trainer 903 may calculate the average image performance score of images that include each level of the feature and calculate the differences between each sequential level of the levels (e.g., average difference of performance scores between a level 1 and a level 2, a level 2 and a level 3, a level 3 and a level 4, etc.). The model trainer 903 may then average the differences to calculate the average incremental change and the impact of a variance in the feature. The model trainer 903 may use any technique to calculate the impact of a variance in a particular feature.

In some embodiments, for a non-binary feature, the model trainer 903 may calculate multiple impacts of a variance in the feature depending on the level of the feature. For example, changes in brightness may only impact the performance scores of images at higher levels of brightness. To account for this case, the model trainer 903 may calculate the impact of changes in variation for different groupings or tiers of brightness (e.g., one impact for 0-25% brightness, another impact for 26%-50% brightness, another impact for 51%-75% brightness, and another impact for 76% brightness, in which each level is a whole percentage value). The model trainer 903 may calculate an impact for each tier to account for groupings of levels of a feature in which changes have the highest and/or lowest impact.

The model trainer 903 assigns weights to the features based on the calculated impact. The weights may be normalized values for the different features that the model trainer 903 has normalized to be within a scale (e.g., 0-1, 0-100, etc.). In some cases, the weights may be the value of the calculated impact. The model trainer 903 may calculate such weights and label or assign the weights to the corresponding features, thus indicating which features have the highest impact on image performance scores.

In some embodiments, the model trainer 903 may calculate weights (e.g., performance score weights) for the image performance scores and/or training images the model trainer 903 plotted in the distribution. The model trainer 903 may calculate such weights based on a "smoothness" of the region within the distribution that contains the respective image performance scores. The smoothness may indicate a consistency of performance scores of images within the region that contains the performance scores (e.g., an average or standard deviation of performance scores within a region of the distribution of images that contain similar features). A region may be a defined region of performance scores that correspond to specific feature values. For example, a region may be an area of the distribution of image performance scores for images that contain cats, are in black and white, include a sun, and contain a sunset. The distribution may be divided into such defined regions by an administrator or automatically by the model trainer 903 that divides the distribution into regions of equal area. In some embodiments, a region may be specific to each training image or image performance score. For example, a region for a training image or image performance score may be or include any image performance score within a defined distance (e.g., a Euclidean distance calculated based on the features of the distribution) of the image performance score. The model trainer 903 may calculate and store such regions for each performance score or training image (e.g., store the performance scores for points within the regions with labels indicating the regions in which the points are located).

The model trainer 903 may calculate a smoothness for each region. To do so, the model trainer 903 may calculate the variation or standard deviation of performance scores within the respective region. For instance, for a region, the model trainer 903 may identify each performance score in the region. The model trainer 903 may calculate the standard deviation of the performance scores and/or differences between each permutation of performance scores and an average of the differences. The smoothness of the region may inversely correlate to the average difference or standard deviation. In one example, a region may have a high smoothness if there is little variation in performance scores in the region and a low smoothness of the performance scores if there is a large variation in performance scores. The model trainer 903 may similarly calculate smoothness for each region and do so in any manner.

The model trainer 903 may calculate a weight for individual performance scores or training images based on the smoothness of the regions in which the performance scores or training images are located. In embodiments in which the model trainer 903 calculates the smoothness of regions on an image performance score basis, the model trainer 903 may calculate the weight based on the smoothness calculated for each individual image performance score. In embodiments in which the model trainer 903 calculates smoothness based on defined regions, the model trainer 903 may calculate the same weight for each image performance score in the region. The model trainer 903 may calculate such weights by normalizing the smoothness (e.g., multiplying the smoothness by a conversion factor) of the region into a weight (e.g., a value between 0 and 1 or 0 and 100) for each image performance score. The model trainer 903 may then assign the weights to the respective image performance scores. By doing so, the model trainer 903 may assign higher weights to performance scores that may be more predictive or representative of an image performance score for a new image to make the model 904 more accurate.

In some embodiments, after generating the model 904 the model trainer 903 may store the generated model in memory (e.g., in a binary file). The model trainer 903 may store the model 904 with an identifier of the target audience that corresponded to the training images the model trainer 903 used to generate the model 904. The model trainer 903 may similarly generate and store models using training images that correspond to other target audiences such that the image analysis module 125 may use the model 904 to simulate the different respective target audiences to calculate image performance scores for new unscored images.

The model trainer 903 trains the generated model. The model trainer 903 may train the generated model using a new training image. For example, the model trainer 903 may receive or retrieve a new training image 912 and/or an image performance score 913 for the new training image 912. In some cases, the model trainer 903 may receive and/or retrieve the new training image 912 responsive to determining the new training image 912 is associated with the same target audience as the training images that were used to train the model 904. In some cases, the model trainer 903 may receive the new training image 912 and/or a target audience identifier for the training image, compare the target audience identifier to the target audience identifiers of models stored in memory and retrieve the model 904 for training based on the target audience identifier of the new training image 912 matching the target audience identifier for the model 904. The model trainer 903 may extract a set of features from the new training image 912 as described above and input the extracted set of features and the image performance score 913 for the new training image 912 into the model 904 as a point on the distribution.

In some embodiments, the model trainer 903 trains the model 904 using the new training image 912 by adjusting the impact of variations in features based on the new training image 912. For example, for each feature (e.g., each feature type) for which the model trainer 903 had previously extracted training images, the model trainer 903 may recalculate average image performance scores of images that contain the respective features and images that do not contain the respective features using the data from the training images and of the new training image 912. The model trainer 903 may then calculate updated differences between the updated averages for the features to calculate the impact of variations in the features. The model trainer 903 may then normalize the differences to calculate the weights for the features. In this way, the model trainer 903 may refine the weights of the individual features for calculating performance scores for new images.

In some embodiments, the model trainer 903 weights the features of the distribution based on the frequencies of features within the training images. For example, the model trainer 903 may maintain a counter for each feature the model trainer 903 extracts from the training images. The model trainer 903 may increment the counter for each feature upon determining the model trainer 903 extracted the feature from a training image. As the model trainer 903 trains the model 904 with new training images, the model trainer 903 may increment the counters based on the features the model trainer 903 extracts from the training images. The model trainer 903 may calculate and adjust the weights of the features based on the counts of the counters such as by multiplying the counts by a conversion factor and/or based on a comparison between the counts of the counters and a total count of each counter the model trainer 903 maintains for features. The model trainer 903 may assign weights to the frequencies based solely on the frequencies and/or adjust the weights for the frequencies calculated based on the impact of variations in the frequencies based on the frequencies. By weighting features based on their frequencies, the model trainer 903 may give higher weights to features that are more common and/or are likely more relevant (or more important) for a target audience.

The model trainer 903 may calculate a weight for the image performance score of the new training image 912. The model trainer 903 may do so by calculating the smoothness of the region of the distribution in which the image performance score is located. The model trainer 903 may do so either based on the image performance scores that are within a defined distance of the new image performance score or based on image performance scores that are within a defined region in which the new image performance score is located. If the model trainer 903 calculates the weight for the new image performance score based on the smoothness of the region within a distance of the new image performance score, the model trainer 903 may calculate the weight for the new image performance score based on the performance scores that are within the distance of the new image performance score and/or recalculate the weights for the image performance scores for which the new image performance score is in a defined distance of the individual image performance scores (e.g., recalculate in the same manner as described above but incorporating the new image performance score). If the model trainer 903 calculates the weight for the new image performance score based on the smoothness of a defined region, the model trainer 903 may calculate the weight for the new image performance score by recalculating the average of differences or standard deviation of image performance scores within the region including the value of the new image performance score. The model trainer 903 may update the weight for each image performance score in the region based on the newly calculated average of differences or standard deviation based on the new image performance score.

In some embodiments, the model trainer 903 may add one or more new axes to the distribution based on the new training image 912. For example, when extracting features from the new training image 912, the model trainer 903 may extract a feature that the model trainer 903 did not previously extract from the original training images or include in the current version of the distribution. Upon extracting and identifying such features, the model trainer 903 may add a new axis for the feature. The model trainer 903 may then update the plots of image performance scores on the distribution based on the new axes. In some cases, the model trainer 903 may do so by adding a null or zero value to the plot or each vector of the image performance scores because the training images that correspond to the image performance scores did not contain the new feature. In some embodiments, the model trainer 903 may calculate a new weight for the new features of the new axes based on the new value using the systems and methods described herein.

After generating and/or training the model 904, the image analysis module 125 may use or execute the model 904 to calculate an image performance score for a candidate image 914. For example, the image analysis module 125 (in some cases via the feature extraction module 120, shown and described with reference to FIG. 1) may execute a neural network to extract a set of features (e.g., a third set of features) from the candidate image 914. The image analysis module 125 may do so, for example, in response to receiving a request from the computing device 906 for an image performance score (e.g., a candidate image performance score) for the candidate image 914. The computing device 906 may include the candidate image 914 in the request or include an identification of the candidate image 914 in the request that the image analysis module 125 may use to query memory to retrieve the candidate image 914. In some embodiments, the image analysis module 125 may identify a target audience for the candidate image 914. The image analysis module 125 may do so, for example, by identifying an identification of the target audience in the request or from a stored identification of the target audience in the database from which the image analysis module 125 retrieved the candidate image 914. The image analysis module 125 may extract the set of features from the candidate image 914 similar to how the image analysis module 125 extracted features from the training images 910 as described above.

The image analysis module 125 executes the model 904 with the set of features from the candidate image 914. In some embodiments, the image analysis module 125 may do so after determining the target audience associated with the candidate image 914 matches the target audience associated with the model 904 (e.g., the image analysis module 125 may compare the target audience for the candidate image 914 with target audience identifiers of multiple models trained in a similar manner to the manner described above using training images specific to different target audiences and identify the model 904 based on the target audience identifiers matching). The image analysis module 125 may execute the model 904 with the set of features from the candidate image 914, for example, by generating a feature vector from the set of features the image analysis module 125 extracted from the candidate image 914 and inputting the feature vector into the model 904. Upon executing the model 904 with the set of features, the image analysis module 125 (e.g., via the model 904) may identify the point on the distribution of the model 904 that corresponds to the extracted features of the candidate image 914. The point may be or correspond to a subset of features that were extracted from the training images 910 and that correspond to the features extracted from the candidate image 914. As described herein, any reference to a point is a reference to the subset of features that correspond to the point. The point may correspond to the extracted features and not a performance score of the image. Each point in the distribution may be a vector including values for the features that were extracted from the image that correspond to the point. The vectors may be labeled with the image performance scores that correspond to the images of the points.

The image analysis module 125 may identify the image performance scores of the training images 910 on the distribution that are closest (e.g., most similar) to the candidate image 914. In some embodiments, the image analysis module 125 (e.g., store the performance scores for points within the regions) may do so by calculating a number of image performance scores to use to calculate determine or calculate an image performance score for the candidate image 914 based on the consistency of performance scores of images that are similar to the candidate image 914. For example, the image analysis module 125 may calculate the number of or a size of image performance scores that are within a defined distance of the point on the distribution that corresponds to the candidate image 914. In some embodiments, the image analysis module 125 may identify the image performance scores and calculate a standard deviation of the image performance scores that are within the distance of the candidate image 914. In some embodiments, instead of using a defined distance to calculate the number, the image analysis module 125 may identify the size or standard deviation of the image performance scores that are in the same defined region as the candidate image 914. The image analysis module 125 may then calculate the number of image performance scores to use as a function of the size or standard deviation either where a higher size or standard deviation equates to a lower number of image performance scores or a higher number of image performance scores. In some embodiments, the image analysis module 125 may identify the number of image performance scores from memory as a value input by a user or administrator.

The image analysis module 125 identifies the calculated number of image performance scores from the distribution. The image analysis module 125 may identify the image performance scores by calculating distances between the point on the distribution for the candidate image 914 and one or more points on the distribution for the other training images. The distance may be an indication of how similar a training image is to the candidate image 914 (e.g., similarity may equal 1−a normalized distance). The image analysis module 125 may calculate the distances as Euclidean distances between the features of the candidate image 914 and the features of the training images. The image analysis module 125 may compare the distances and identify the calculated number of points that have the lowest distances of the calculated distances. The image analysis module 125 may then identify an image performance scores 917 that correspond to the identified points.

In some embodiments, the image analysis module 125 may calculate the distances between the point for the candidate image 914 and the points for the training images as a weighted distance. The distance may be weighted based on the weights of the features (e.g., the feature weights) of the candidate image 914, the respective training images, and/or the distribution in general. The image analysis module 125 may calculate the distance as a weighted Euclidean distance between points. In doing so, the image analysis module 125 may improve the accuracy of the model 904 by identifying image performance scores of images with features that consistently affect the image performance scores of images instead of features that have an unpredictable effect.

The image analysis module 125 calculates the candidate image performance score. The image analysis module 125 calculates the candidate image performance score from the identified image performance scores. To do so, the image analysis module 125 may calculate an average of the identified image performance scores and set the candidate image performance score as the average of the identified image performance scores. In embodiments in which the image analysis module 125 calculates weights for the different image performance scores based on the smoothness of the regions containing the image performance scores, the image analysis module 125 may calculate the image performance score for the candidate image 914 as a weighted average of image performance scores based on the assigned weights of the identified image performance scores.

In some embodiments, the image analysis module 125 may adjust the weights of the identified image performance scores when calculating the image performance score for the candidate image 914. The image analysis module 125 may do so, for example, based on the distances between the point for the candidate image 914 and the points for the training images. The distances may be the weighted distances or unweighted distances as described above. In doing so, the image analysis module 125 may increase the weights for image performance scores that are a shorter distance from the point for the candidate image 914 and/or decrease the weights for image performance scores that are a further distance from the point for the candidate image 914. The image analysis module 125 may then calculate a weighted average of the image performance scores with the adjusted weights. In this way, the image analysis module 125 may increase the accuracy of the model 904 by ensuring images that are most similar to the candidate image 914 have the highest impact on the candidate performance score for the candidate image 914.

In some embodiments, instead of identifying a defined number of image performance scores to use to calculate the image performance score for the candidate image 914, the image analysis module 125 may identify image performance scores that are similar to the candidate image 914 within a threshold. For example, the image analysis module 125 may determine which image performance scores correspond to points that are a distance (e.g., a weighted or unweighted distance as described above) within a threshold (e.g., a distance threshold) of the candidate image 914. The threshold may be a defined threshold as input by a user or administrator. The image analysis module 125 may calculate distances between the point for the candidate image 914 and the points on the distribution (e.g., generate a list of distances). The image analysis module 125 may compare the distances to the threshold. The image analysis module 125 disregards (e.g., remove from the list) points and the corresponding image performance scores that correspond to distances above the threshold. The image analysis module 125 identifies the points and the image performance scores that correspond to the points that are less than the threshold. In this way, the image analysis module 125 may identify image performance scores for images that are similar above a threshold to the candidate image 914 to use to calculate an image performance score for the candidate image 914. The image analysis module 125 may then calculate the candidate image performance score 917 from the identified image performance scores in a similar manner to the manner described above.

The image analysis module 125 generates a record (e.g., a file, document, table, listing, message, notification, etc.) comprising the candidate image performance score. The image analysis module 125 may generate the record by instantiating the record and including or adding the candidate image performance score to the record. In some embodiments, the image analysis module 125 may identify the features of the image that correspond to the highest weight (e.g., the features with weights above a threshold and/or a defined number of the highest weighted features such as the five features with the highest weights compared to the other features of the candidate image 914). The image analysis module 125 may include the identified features in the record to indicate the features that had the highest impact on the calculated image performance score 917 for the image.

In some embodiments, the image analysis module 125 may add identifications of features that had the highest positive or negative impact on the image performance score for the image in the record. To do so, for example, for each feature extracted from the candidate image 914, the image analysis module 125 may calculate the average image performance scores of images that contain the feature. The image analysis module 125 may compare the average image performance scores to a threshold (e.g., a positive threshold) and identify any features that correspond to an image performance score that exceeds the threshold as having a high positive impact on the image performance score. The image analysis module 125 may similarly identify features that had a high negative impact on the image performance score by comparing average image performance scores for features to a threshold (e.g., a low threshold) and identifying any features with average image performance scores below the threshold. The image analysis module 125 may add identifications of the high performing and low performing features in the record with a corresponding text or other visual description to indicate which features positively and/or negatively impacted the image performance score for the candidate image 914.

The image analysis module 125 transmits the record to the computing device 906 that requested the image performance score. The image analysis module 125 may transmit the record in a data packet 916 that includes the image performance score 917 with or without the candidate image 914. After doing so, the computing device 906 may display the image performance score and any other data included in the record on a user interface.

Figure 9B:
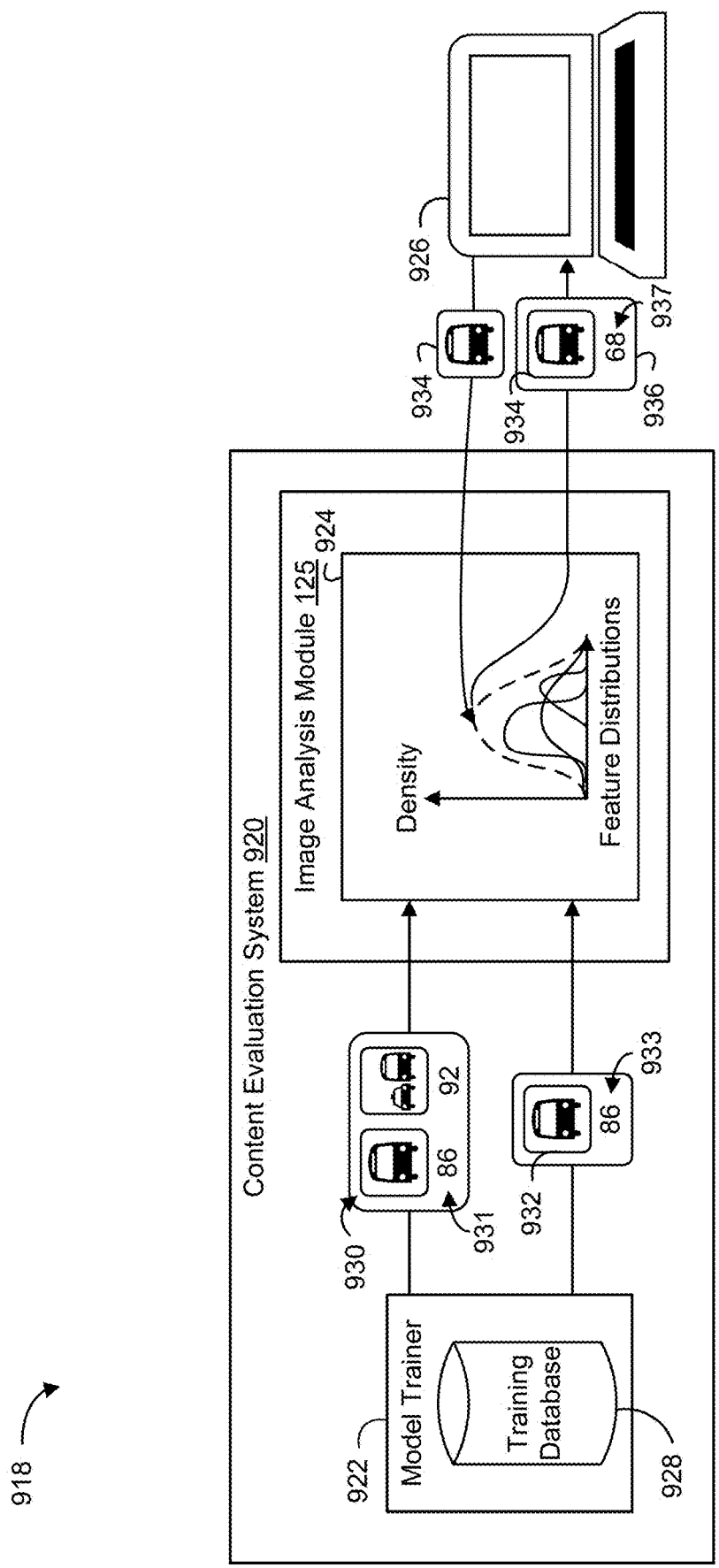

FIG. 9B illustrates a sequence 918 for training and implementing a model for image evaluation, in accordance with one or more implementations. The sequence 900 may be performed by a content evaluation system 920, which may be the same as or similar to the server(s) 105, shown and described with reference to FIG. 1. In brief overview, FIG. 9B illustrates the sequence 918 in which the content evaluation system 920 executes a model trainer 922 to generate and/or train a model 924 that can be executed by the image analysis module 125. Via the model trainer 922, the content evaluation system 920 may generate the model 924 such that the model 924 may calculate image performance scores for new images based on a distribution of performance scores and features within the training images. Upon generating the model 924, the image analysis module 125 may execute the model 926 to calculate performance scores for new images or candidate images, such as upon receiving a request for such image performance scores from a computing device 926. The computing device 926 may be the same as or similar to the client computing platform(s) 110, shown and described with reference to FIG. 1.

The model trainer 922 may comprise programmable instructions that, upon execution, cause the content evaluation system 920 to generate and/or train the model 924 to calculate image performance scores for images. The model trainer 922 may receive a plurality of training images 930. The training images 930 may be images the model trainer 922 stores and/or retrieves from a training database 928 of images that the model trainer 922 may use to train or generate the model 924 to calculate image performance scores for images. The model trainer 922 may receive image performance scores 931 that correspond to the training images 930 in a similar manner and/or by identifying a stored association between the training images 930 and the image performance scores 931. In some embodiments, the training database 928 of images may be stored locally in memory of the content evaluation system 920. In such embodiments, the model trainer 922 may receive the plurality of training images 930 by retrieving the training images 930 from the training database 928. In some embodiments, the training database 928 may be stored in memory of an external or remote computing device. In such embodiments, the model trainer 922 may retrieve the training images 930 by sending a request for the training images 930 to the external or remote computing device. The model trainer 922 may store and/or retrieve the training images 930 in any manner.

In some embodiments, the model trainer 922 may retrieve and/or select the training images 930 that correspond to a specific target audience. The training database 928 may store target audience identifiers with images that are associated with users of the particular target audience (e.g., images that are typically viewed and/or interacted with by users of the target audience). In embodiments in which the model trainer 922 stores images in a local database, the model trainer 922 may retrieve images from the local database that correspond to a target audience by querying the database using an identifier of the target audience and retrieving images that are associated with a matching target audience identifier. In embodiments in which the model trainer 922 retrieves images from a remote database, the model trainer 922 may include an identifier of a target audience in a request for images and the computer storing the remote database may perform a similar query. By retrieving images that correspond to a specific target audience, the model trainer 922 may use the images to generate and/or train the model 924 to calculate performance scores for images for that specific target audience.

The model trainer 922 (in some cases via the feature extraction module 120) may extract features from the training images 930. The model trainer 922 may do so in a similar manner to how the model trainer 903 extracted features from the training images 910, both shown and described with reference to FIG. 9A.

The model trainer 922 adds image performance scores to the extracted features. The model trainer 922 may add the image performance scores 931 for the training images 930 to feature vectors comprising values for the extracted features for the corresponding images. For example, the model trainer 922 may execute a neural network to extract a set of features from a training image. The features may be values that represent the features of the training image. The model trainer 922 may generate a feature vector from the values by inserting the values at index values in the feature vector that correspond to the features of the values. The model trainer 922 may then retrieve an image performance score 931 for the training image from memory that the model trainer 922 may have previously calculated using other methods such as one of the models or methods described herein or from a user input. The model trainer 922 may then add the image performance score 931 to the feature vector by concatenating the image performance score to the feature vector or by inserting the image performance score into an index value of the feature vector that corresponds to image performance scores. The model trainer 922 may similarly generate feature vectors with image performance scores for any number of training images.

The model trainer 922 generates the model 924. The model trainer 922 may generate the model 924 from the sets of features of the training images 930 and/or the performance scores the model trainer 922 assigned or labeled to the sets of features. To generate the model 924, for example, the model trainer 922 calculates frequencies of the features within the plurality of training images 930 and the image performance scores 931 for the training images 930. The model trainer 922 may calculate the frequencies by identifying the different types of features that the model trainer 922 extracted from the training images 930 and the image performance scores 931 for the training images 930. For non-binary features, the model trainer 922 may identify each level of the feature as a separate feature. The model trainer 922 may maintain a counter for each feature. The model trainer 922 may maintain a counter for each possible performance score (e.g., maintain a counter for each natural value between 0 and 100 or for each tenth of a value between 0 and 1). The model trainer 922 may identify the training images from which a feature of a respective image was extracted and that corresponds to a particular image performance score and increment the corresponding counter for each feature and/or image performance score. In the case of binary features, the model trainer 922 may maintain and increment separate counters for training images that have a particular feature and for training images that do not have the same feature. The counts (e.g., the final incremented values after evaluating each training image) of the counters may indicate the frequencies of the features and/or image performance scores within the training images.

In some embodiments, the model trainer 922 assigns weights to features based on the frequencies. The model trainer 922 may assign the weights to the features by storing associations between the weights and the corresponding features. The model trainer 922 may assign weights to the features according to weights that are input by an administrator or user. In some embodiments, the model trainer 922 may assign the weights based on the frequencies of the features within the training images. For instance, the model trainer 922 may compare the frequencies of the features and calculate weights (e.g., values between 0 and 1 or another scale) for the different features such that features with higher frequencies have higher weights. By doing so, the model trainer 922 may cause the more common features to have a greater impact when the model trainer 922 calculates image performance scores for candidate images. Doing so may improve accuracy as the model trainer 922 may not improperly take less common variables into account that may not be as tuned or accurate in calculating image performance scores. In some embodiments, the model trainer 922 may assign the highest weight to the image performance score feature. By doing so, the model trainer 922 may better distinguish between high performing features (e.g., features that have a high positive impact on image performance scores) and low performing features (e.g., features that have a high negative impact on image performance score).

The model trainer 922 may generate a distribution of the image performance scores according to the frequencies of the features extracted from the training images 930. The model trainer 922 may generate the distribution, for example, as a Gaussian mixture model. In such a Gaussian mixture model, each feature, including image performance score, extracted from the training images may have its own Gaussian distribution. Together, the distributions may indicate the confidence of the model 924 in a particular image performance score based on the frequency of the features within a particular region (e.g., a defined set of features and/or frequencies or densities of features) including the image performance score. Higher densities in the distribution may represent the regions with a higher confidence (e.g., a higher confidence score) for an image performance score. For instance, moving along the performance score axis of the distribution toward higher image performance scores, the peaks that exist for higher scores may indicate regions in which the model 924 indicates a high confidence that the features of the region will positively impact an image performance score. Accordingly, the model trainer 922 may generate the model 924 from a distribution of features in a set of training images and image performance scores for the training images such that the model trainer 922 may use the model 924 to calculate image performance scores for candidate images.

The model trainer 922 may update the distribution of the image performance scores and/or frequencies of features over time. To do so, for example, the model trainer 922 may identify a new training image 932 that corresponds to the same target audience as the model 924 and/or the training images used to generate the model 924. The model trainer 922 may extract features from the new training image 932 and increment the counters of the distribution according to the extracted features. The model trainer 922 may also identify a new image performance score 933 that corresponds to the new training image 932. The model trainer 922 may increment a counter that correspond to the new image performance score 933 to update the distribution. By doing so for different images over time, the model trainer 922 may update the distribution taking into account changes in performance of images as people develop new tastes.

In some embodiments, after generating the model 924, the model trainer 922 may store the generated model in memory (e.g., in a binary file) of the content evaluation system 920. The model trainer 922 may store the model 924 with an identifier of the target audience that corresponded to the training images the model trainer 922 used to generate the model 924. The data processing system may similarly generate and store models using training images that correspond to other target audiences such that the image analysis module 125 may use the model 924 to simulate the different respective target audiences to calculate image performance scores for new unscored images.

The image analysis module 125 (in some cases via the feature extraction module 120) executes a neural network to extract a set of features from a candidate image 934. The image analysis module 125 may do so, for example, in response to receiving a request from the computing device 926 for an image performance score (e.g., a candidate image performance score) for the candidate image 934. The computing device 926 may include the candidate image 934 in the request or include an identification of the candidate image 934 in the request that the image analysis module 125 may use to query memory or a remote computer to retrieve the candidate image 934. In some embodiments, the image analysis module 125 may identify a target audience for the candidate image 934. The image analysis module 125 may do so, for example, by identifying an identification of the target audience in the request or from a stored identification of the target audience in the database from which the image analysis module 125 retrieved the image. The image analysis module 125 may extract a set of features from the candidate image 934 similar to how the model trainer 922 extracted features from the training images 930.

The image analysis module 125 executes the model 924 with the set of features from the candidate image 934. In some embodiments, the image analysis module 125 may do so after determining the target audience associated with the candidate image 934 matches the target audience associated with the model 924 (e.g., the image analysis module 125 may compare the target audience for the candidate image 934 with target audience identifiers of multiple models trained in a similar manner to the manner described above but with images associated with different target audiences and identify the model 924 based on the target audience identifiers matching). The image analysis module 125 may execute the model 924 with the set of features from the candidate image 934, for example, by generating a feature vector from the set of features the image analysis module 125 extracted from the candidate image 934 and inputting the feature vector into the model 924.

Upon executing the model 924 with the set of features, the image analysis module 125 (e.g., via the model 924) generates a line on the distribution from the set of features of the candidate image 934. The image analysis module 125 may generate the line as a plurality of points indicating the features the image analysis module 125 extracted from the candidate image 934. The points on the line may also or instead each indicate a different confidence score for a different image performance score for the candidate image 934. The confidence score may indicate a frequency or density of features that correspond to a particular image performance score (e.g., high frequencies of features (e.g., a high density of features) that correspond to a particular image performance score or set of image performance scores may indicate a high confidence that images that have the high frequency features will have the image performance score as well). In some embodiments, the data processing system may calculate the frequency or density of features for a point using a Gaussian density function.

The image analysis module 125 identifies a point on the line that has a highest density or highest frequency of features of the plurality of points on the line. The image analysis module 125 may compare the frequencies or densities of each of the plurality of points on the line. As described above, each frequency or density for a point may indicate a confidence of the model 924 in the image performance score or image performance scores that correspond to the point. The image analysis module 125 may calculate such frequencies for points by calculating the frequencies of different features that correspond to the individual points of image performance scores. Higher frequencies or densities may indicate higher confidence in an image performance score. The image analysis module 125 may compare the frequencies or densities for the different points and identify the points that correspond to the highest frequency or density. The image analysis module 125 may identify the image performance score that corresponds to the point to identify the candidate image performance score 937 for the candidate image 934.

The image analysis module 125 generates a record comprising the candidate image performance score 937 for the candidate image 934. To do so, the image analysis module 125 may instantiate the record and include or add the candidate image performance score 937 to the record.

In some embodiments, the image analysis module 125 may include or add identifications of features that had the highest positive or negative impact on the image performance score 937 for the candidate image 934. For example, the image analysis module 125 may determine which features correspond to a frequency above a first threshold and a performance score above a second threshold. The image analysis module 125 may do so by identifying higher performance scores (e.g., performance scores above the second threshold) in the distribution on the line and identify the frequencies of features that correspond to the higher performance scores. The image analysis module 125 may compare the frequencies to the first threshold and identify features with frequencies that exceed the first threshold based on the comparison. The image analysis module 125 may similarly calculate features that had the most negative impact on the candidate image 934's performance score 937 by identifying performance scores below a fifth threshold on the line and features that have a frequency above the first threshold or a sixth threshold.

The image analysis module 125 may add the features identified as having the most positive impact and/or the features identified as having the most negative impact on the image performance score 937 of the candidate image 934 to the record. The image analysis module 125 may include the positive impact and/or negative impact features in the record depending on the request (e.g., the image analysis module 125 may only include the positive impact features and/or the negative impact features if a request for such features was included in the request from the computing device for the image performance score 937 for the candidate image 934).

In some embodiments, the image analysis module 125 may add recommendations of features to change in the candidate image 934 to improve the image performance score of the candidate image 934. To do so, the image analysis module 125 may identify regions in the distribution in which the image performance scores are high (e.g., above a threshold). The image analysis module 125 may identify features with high frequencies in the region as features that can improve the performance score of an image. The image analysis module 125 may add an identification of the identified high performing features to the record with a textual description indicating the features in the candidate image 934 or future images that would increase the image performance score 937 of the candidate image 934 or the future images.

The image analysis module 125 transmits the record to the computing device 926 that requested the image performance score for the candidate image 934. The image analysis module 125 may transmit the record in a data packet 936 that includes the image performance score 937 with or without the candidate image 934. After doing so, the computing device 926 may display the image performance score and any other data included in the record on a user interface.

Figure 10:
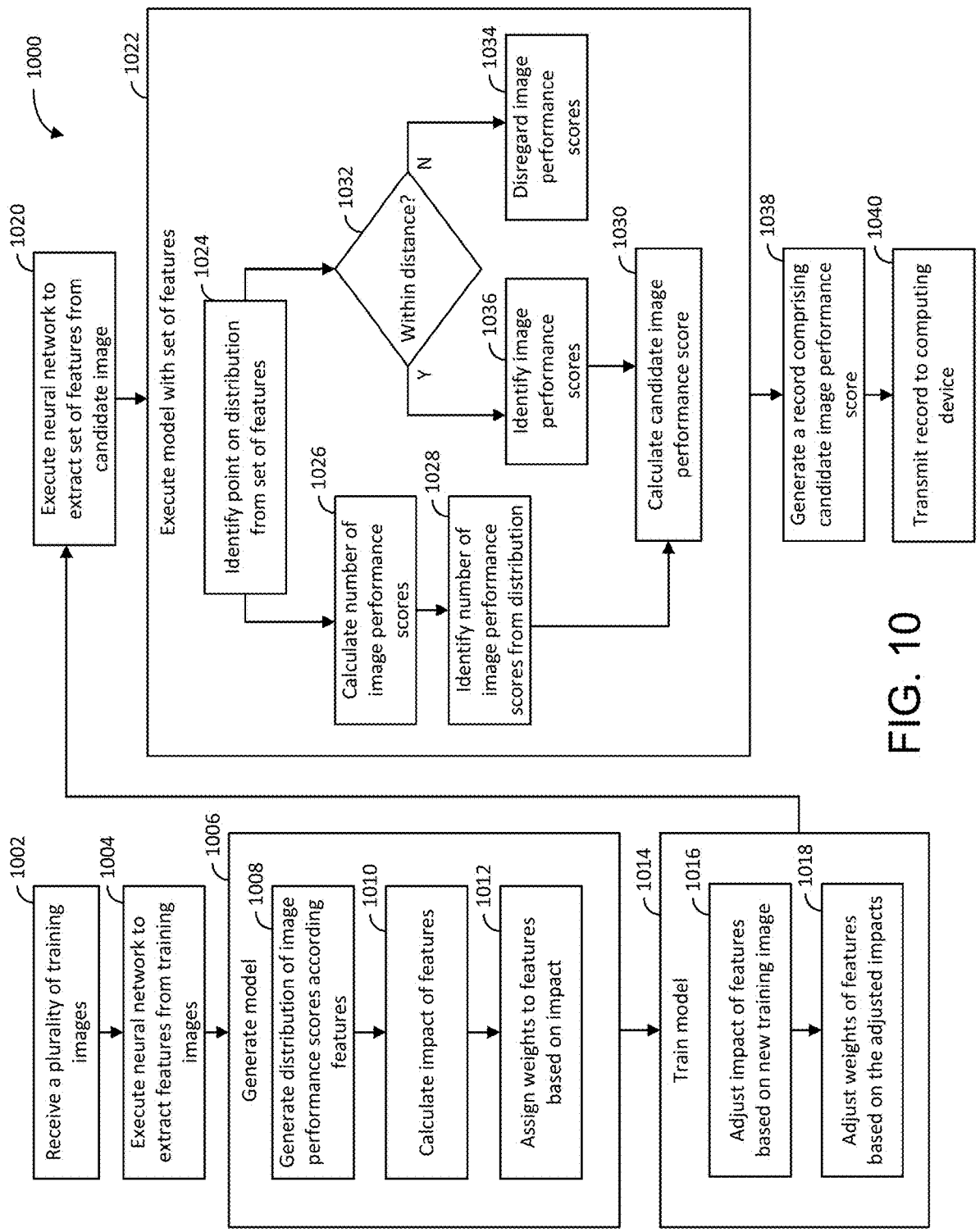
FIG. 10 illustrates a method for training and implementing a model for image evaluation, in accordance with one or more implementations.

FIG. 10 is a flow diagram illustrating a method for training and implementing a model for image evaluation, in accordance with one or more implementations. In some implementations, the method 1000 can be performed by a data processing system such as any of the components of the system of the sequence 900 shown in FIG. 9A or the system 100 shown in FIG. 1. The method 1000 may include more or fewer operations and the operations may be performed in any order. Performance of method 1000 may enable the data processing system to train and use a model to calculate image performance scores for images over time. The performance scores may indicate how the images will likely perform with a target audience (e.g., how likely an individual is to interact with the image). For example, using one or more neural networks, the data processing system may use training images and performance scores for the training images to generate a distribution of performance scores according to the features of the images that correspond to the performance scores. The performance scores and/or the features that correspond to the performance scores may be weighted such that the performance scores and/or corresponding features that have the highest impact on the performance scores are weighted higher. Accordingly, when the data processing system executes the model for a new candidate image, the model may generate an accurate performance score for the candidate image. As described herein, solely for succinctness, each reference to an image may be a reference to a video.

At operation 1002, the data processing system receives a plurality of training images. The training images may be images the data processing system stores and/or retrieves from a database of images that the data processing system may use to train or generate a model to calculate image performance scores for images. In some embodiments, the database of images may be stored locally in memory of the data processing system. In such embodiments, the data processing system may receive the plurality of training images by retrieving the images from the database. In some embodiments, the database may be stored in memory of an external or remote computing device. In such embodiments, the data processing system may retrieve the images by sending a request for the images to the external or remote computing device. The data processing system may store and/or retrieve the training images in any manner.

In some embodiments, the data processing system may retrieve and/or select training images that correspond to a specific target audience. The local or external database may store target audience identifiers with images that are associated with users of the particular target audience (e.g., images that are typically viewed and/or interacted with by users of the target audience). In embodiments in which the data processing system stores images in a local database, the data processing system may retrieve images from the local database that correspond to a target audience by querying the database using an identifier of the target audience and retrieving images that are associated with a matching target audience identifier. In embodiments in which the data processing system retrieves images from a remote database, the data processing system may include an identifier of the target audience in a request for images and the computer storing the remote database may perform a similar query. By retrieving images that correspond to a specific target audience, the data processing system may use the images to generate and/or train a model to calculate performance scores for images for that specific target audience (e.g., calculate predicted amounts of interaction members of the target audience will have with different images).

At operation 1004, the data processing system executes a neural network to extract features from the received training images. For example, the data processing system may input a training image into a neural network (e.g., a feature extraction neural network). The neural network may be trained to automatically extract features from the training image. Such features may be or may include descriptors of the training image such as identifications of objects within the training image, colors within the training image, scenery within the training image, shades of colors within the training image, etc. The data processing system may execute the neural network with the training image and output values for the different features, thus extracting features from the training image. The data processing system may format the extracted features into a feature vector for the training image by setting the values for the extracted at different index values of the vector. The data processing system may similarly extract features for each of the received training images. In this way, the data processing system may extract a plurality of features from the plurality of training images in a format that the data processing system may use to generate and/or train a model to calculate image performance scores for images. The data processing system may use such a neural network or any other feature extraction technique to extract features from images.

In some embodiments, the data processing system may assign performance scores to sets of features that were each extracted from different training images. For example, the data processing system may organize the features that were extracted from each training image into a vector comprising a set of features that were extracted from the training image. The data processing system may assign or label the set with an image performance score that indicates the image performance score that corresponds to the training image from which the set of features was extracted. The image performance score may have been input by a user or administrator or pre-calculated using other methods. The data processing system may similarly assign performance scores to sets of features for different training images to create sets of data that the data processing system may use to generate a model to calculate image performance scores for new unlabeled images.

At operation 1006, the data processing system generates a model. The data processing system may generate the model from the sets of features of the training images and/or the performance scores the data processing system assigned or labeled to the sets of features. For example, during operation 1006, at operation 1008, the data processing system generates a distribution of image performance scores according to the features of the images that correspond to the image performance scores. The data processing system may generate the distribution as a multi-dimensional graph in which each feature the data processing system extracted from the plurality of training images corresponds to an axis in the graph (e.g., one axis may indicate whether an image includes a dog, another axis may indicate whether an image includes multiple people, etc.). The axes in the graph may be binary (e.g., indicate whether an image includes a feature or not) or non-binary (e.g., indicate a level of a feature such as an RGB value of an image or a count of a specific feature such as a number of animals in the image). The distribution may include an axis for performance scores in addition to axes for the different features. The data processing system may generate the distribution by plotting the image performance scores in the graph according to the features of the images that correspond to the image performance scores. Accordingly, the data processing system may generate a model that illustrates a comparison of image performance scores with the features that correspond to the image performance scores.

At operation 1010, the data processing system calculates impacts of the different features. The impact may be an impact that a variation (e.g., a change) in a feature may have on an image performance score for an image. The data processing system may calculate the impact of variations in a feature in a few manners. For example, for a binary feature (e.g., a feature that an image has or does not have) the data processing system may calculate the impact of a variation in a feature by first identifying and calculating a first average of image performance scores of a set of training images that contain the feature and a second average of image performance scores of a set of training images that do not contain the feature. The data processing system may calculate the variance as the difference between the two averages. In another example, for a non-binary feature (e.g., a feature that an image may have different levels of), the data processing system may calculate the impact of a variance as an average incremental change between the different levels of the feature. The data processing system may calculate the average image performance score of images that include each level of the feature and calculate the differences between the levels. The data processing system may then average the differences to calculate the average incremental change and the impact of a variance in the feature. The data processing system may use any technique to calculate the impact of a variance in a particular feature.

In some embodiments, for a non-binary feature, the data processing system may calculate multiple impacts of a variance in the feature depending on the level of the feature. For example, changes in brightness may only impact the performance scores of images at higher levels of brightness. To account for this case, the data processing system may calculate the impact of changes in variation for different groupings or tiers of brightness (e.g., one impact for 0-25% brightness, another impact for 26%-50% brightness, another impact for 51%-75% brightness, and another impact for 76% brightness, in which each level is a whole percentage value). The data processing system may calculate an impact for each tier to account for groupings of levels of a feature in which changes have the highest and/or lowest impact.

At operation 1012, the data processing system assigns weights to the features based on the calculated impact. The weights may be normalized values for the different features that the data processing system has normalized to be within a scale (e.g., 0-1, 0-100, etc.). In some cases, the weights may be the value of the calculated impact. The data processing system may calculate such weights and label or assign the weights to the corresponding features, thus indicating which features have the highest impact on image performance scores.

In some embodiments, the data processing system may calculate weights (e.g., performance score weights) for the image performance scores and/or training images the data processing system plotted in the distribution. The data processing system may calculate such weights based on a "smoothness" of the region within the distribution that contains the respective image performance scores. The smoothness may indicate a consistency of performance scores of images within the region that contains the performance scores (e.g., an average or standard deviation of performance scores within a region of the distribution of images that contain similar features). A region may be a defined region of performance scores that correspond to specific feature values. For example, a region may be an area of the distribution of image performance scores for images that contain cats, are in black and white, include a sun, and contain a sunset. The distribution may be divided into such defined regions by an administrator or automatically by the data processing system that divides the distribution into regions of equal area. In some embodiments, a region may be specific to each training image or image performance score. For example, a region for a training image or image performance score may be or include any image performance score within a defined distance (e.g., a Euclidean distance calculated based on the features of the distribution) of the image performance score. The data processing system may calculate and store such regions (e.g., store the performance scores for points within the regions) for each performance score or training image.

The data processing system may calculate a smoothness for each region. To do so, the data processing system may calculate the variation or standard deviation of performance scores within the respective region. For instance, for a region, the data processing system may identify each performance score in the region. The data processing system may calculate the standard deviation of the performance scores and/or differences between each permutation of performance scores and an average of the differences. The smoothness of the region may inversely correlate to the average difference or standard deviation. In one example, a region may have a high smoothness if there is little variation in performance scores in the region and a low smoothness of the performance scores if there is a large variation in performance scores. The data processing system may similarly calculate smoothness for each region and do so in any manner.

The data processing system may calculate a weight for individual performance scores or training images based on the smoothness of the regions in which the performance scores or training images are located. In embodiments in which the data processing system calculates the smoothness of regions on an image performance score basis, the data processing system may calculate the weight based on the smoothness calculated for each individual image performance score. In embodiments in which the data processing system calculates smoothness based on defined regions, the data processing system may calculate the same weight for each image performance score in the region. The data processing system may calculate such weights by normalizing the smoothness (e.g., multiplying the smoothness by a conversion factor) of the region into a weight (e.g., a value between 0 and 1 or 0 and 100) for each image performance score. The data processing system may then assign the weights to the respective image performance scores. By doing so, the data processing system may assign higher weights to performance scores that may be more predictive or representative of an image performance score for a new image to make the model more accurate.

In some embodiments, after generating the model, the data processing system may store the generated model in memory (e.g., in a binary file). The data processing system may store the model with an identifier of the target audience that corresponded to the training images the data processing system used to generate the model. The data processing system may similarly generate and store models using training images that correspond to other target audiences such that the data processing system may use the model to simulate the different respective target audiences to calculate image performance scores for new unscored images.

At operation 1014, the data processing system trains the generated model. The data processing system may train the generated model using a new training image (e.g., a second training image). For example, the data processing system may receive or retrieve a new training image and/or an image performance score for the new training image. In some cases, the data processing system may receive and/or retrieve the new training image responsive to determining the new training image is associated with the same target audience as the training images that were used to train the model. In some cases, the data processing system may receive the new training image and/or a target audience identifier for the training image, compare the target audience identifier to the target audience identifiers of models stored in memory and retrieve the model for training based on the target audience identifier of the new training image matching the target audience identifier for the model. The data processing system may extract a set of features from the new training image as described above and input the extracted set of features and the image performance score for the new training image into the model as a point on the distribution.

In some embodiments, at operation 1016, the data processing system trains the model using the new training image by adjusting the impact of variations in features based on the new training image. In one example, the data processing system may identify a set of features (e.g., a first set of features) of the features the data processing system extracted from the training images and that correspond to the features extracted from the new training image and individually recalculate average image performance scores of images that contain the respective features and images that do not contain the respective features using the data from the training images and of the new training image. In another example, for each feature for which the data processing system had previously extracted training images, the data processing system may recalculate average image performance scores of images that contain the respective features and images that do not contain the respective features using the data from the training images and of the new training image. The data processing system may then calculate updated differences between the updated averages for the features to calculate the impact of variations in the features. The data processing system may then normalize the differences to calculate the weights for the features. In this way, the data processing system may refine the weights of the individual features for calculating performance scores for new images.

In some embodiments, the data processing system weights the features of the distribution based on the frequencies of features within the training images. For example, the data processing system may maintain a counter for each feature the data processing system extracts from the training images. The data processing system increment the counter for each feature upon determining the data processing system extracted the feature from a training image. As the data processing system trains the model with new training images, the data processing system may increment the counters based on the features the data processing system extracts from the training images. The data processing system calculate and adjust the weights of the features based on the counts of the counters such as by multiplying the counts by a conversion factor and/or based on a comparison between the counts of the counters and a total count of each counter the data processing system maintains for features. The data processing system may assign weights to the frequencies based solely on the frequencies and/or adjust the weights for the frequencies calculated based on the impact of variations in the frequencies based on the frequencies. By weighting features based on their frequencies, the data processing system may give higher weights to features that are more common and/or are likely more relevant (or more important) for a target audience.

The data processing system may calculate a weight for the image performance score of the new training image. The data processing system may do so by calculating the smoothness of the region of the distribution in which the image performance score is located. The data processing system may do so based on the image performance scores that are within a defined distance of the new image performance score or based on image performance scores that within a defined region in which the new image performance score is located. If the data processing system calculates the weight for the new image performance score based on the smoothness of the region within a distance of the new image performance score, the data processing system may calculate the weight for the new image performance score based on the performance scores that are within the distance of the new image performance score and/or recalculate the weights for the image performance scores for which the new image performance score is in a defined distance of the individual image performance scores (e.g., recalculate in the same manner as described above but incorporating the new image performance score). If the data processing system calculates the weight for the new image performance score based on the smoothness of a defined region, the data processing system may calculate the weight for the new image performance score by recalculating the average of differences or standard deviation of image performance scores within the region including the value of the new image performance score. The data processing system may update the weight for each image performance score in the region based on the newly calculated average of differences or standard deviation based on the new image performance score.

In some embodiments, the data processing system may add one or more new axes to the distribution based on the new training image. For example, when extracting features from the new training image, the data processing system may extract a feature that the data processing system did not previously extract from the original training images or include in the current version of the distribution. Upon extracting and identifying such features, the data processing system may add a new axis for the feature. The data processing system may then update the plots of image performance scores on the distribution based on the new axes. In some cases, the data processing system may do so by adding a null or zero value to the plot or each vector of the image performance scores because the training images that correspond to the image performance scores did not contain the new feature. In some embodiments, the data processing system may calculate a new weight for the new features of the new axes based on the new value using the systems and methods described herein.

After generating and/or training the model, the data processing system may use or execute the model to calculate an image performance score for a candidate image. For example, at operation 1020, the data processing system may execute a neural network to extract a set of features (e.g., a third set of features) from the candidate image. The data processing system may do so, for example, in response to receiving a request from a computing device for an image performance score (e.g., a candidate image performance score) for the candidate image. The computing device may include the candidate image in the request or include an identification of the candidate image in the request that the data processing system may use to query memory to retrieve the candidate image. In some embodiments, the data processing system may identify a target audience for the candidate image. The data processing system may do so, for example, by identifying an identification of the target audience in the request or from a stored identification of the target audience in the database from which the data processing system retrieved the candidate image. The data processing system may extract the set of features from the candidate image similar to how the data processing system extracted features from the training images as described with reference to operation 1004.

At operation 1022, the data processing system executes the model with the set of features from the candidate image. In some embodiments, the data processing system may do so after determining the target audience associated with the image matches the target audience associated with the model (e.g., the data processing system may compare the target audience for the candidate image with target audience identifiers of multiple models trained in a similar manner to the manner described with respect to operations 1002-1018 using training images specific to different target audiences and identify the model based on the target audience identifiers matching). The data processing system may execute the model with the set of features from the candidate image, for example, by generating a feature vector from the set of features the data processing system extracted from the candidate image and inputting the feature vector into the model. Upon executing the model with the set of features, at operation 1024, the data processing system (e.g., via the model) may identify the point on the distribution of the model that corresponds to the extracted features of the candidate image. The point may be or correspond to a subset of features that were extracted from the training images and that correspond to the features extracted from the candidate image. As described herein, any reference to a point is a reference to the subset of features that correspond to the point. The point may correspond to the extracted features and not a performance score of the image. Operations 1024-1034 may be performed by the model upon execution by the data processing system.

The data processing system may identify the image performance scores of the training images of the distribution that are closest (e.g., most similar) to the candidate image. In some embodiments, the data processing system may do so by calculating a number of image performance scores to use to calculate determine or calculate an image performance score for the candidate image based on the consistency of performance scores of images that are similar to the candidate image. For example, at operation 1026, the data processing system calculates the number of or a size of image performance scores that are within a defined distance of the point on the distribution that corresponds to the candidate image. In some embodiments, the data processing system may identify the image performance scores and calculate a standard deviation of the image performance scores that are within the distance of the candidate image. In some embodiments, instead of using a defined distance to calculate the number, the data processing system may identify the size or standard deviation of the image performance scores that are in the same defined region as the candidate image. The data processing system may then calculate the number of image performance scores to use as a function of the size or standard deviation either where a higher size or standard deviation equates to a lower number of image performance scores or a higher number of image performance scores. In some embodiments, the data processing system may identify the number of image performance scores from memory as a value input by a user or administrator.

At operation 1028, the data processing system identifies the calculated number of image performance scores from the distribution. The data processing system may identify the image performance scores by calculating distances between the point on the distribution for the candidate image and one or more points on the distribution for the other training images. The distance may be an indication of how similar a training image is to the candidate image (e.g., similarity may equal 1−a normalized distance). The data processing system may calculate the distances as Euclidean distances between the features of the candidate images and the features of the training images. The data processing system may compare the distances and identify the calculated number of points that have the lowest distances of the calculated distances. The data processing system may then identify the image performance scores that correspond to the identified points.

In some embodiments, the data processing system may calculate the distances between the point for the candidate images and the points for the training images as a weighted distance. The distance may be weighted based on the weights of the features (e.g., the feature weights) of the candidate image, the respective training images, and/or the distribution in general. The data processing system may calculate the distance as a weighted Euclidean distance between points. In doing so, the data processing system may improve the accuracy of the model by identifying image performance scores of images with features that consistently affect the image performance scores of images instead of features that have an unpredictable effect.

At operation 1030, the data processing system calculates the candidate image performance score. The data processing system calculates the candidate image performance score from the identified image performance scores. To do so, the data processing system may calculate an average of the identified image performance scores and set the candidate image performance score as the average of the identified image performance scores. In embodiments in which the data processing system calculates weights for the different image performance scores based on the smoothness of the regions containing the image performance scores, the data processing system may calculate the image performance score for the candidate image as a weighted average of image performance scores based on the assigned weights of the identified image performance scores.

In some embodiments, the data processing system may adjust the weights of the identified image performance scores when calculating the image performance score for the candidate image. The data processing system may do so, for example, based on the distances between the point for the candidate image and the points for the training images. The distances may be the weighted distances or unweighted distances as described above. In doing so, the data processing system may increase the weights for image performance scores that are a shorter distance from the point for the candidate image and/or decrease the weights for image performance scores that are a further distance from the point for the candidate image. The data processing system may then calculate a weighted average of the image performance scores with the adjusted weights. In this way, the data processing system may increase the accuracy of the model by ensuring images that are most similar to the candidate image have the highest impact on the candidate performance score for the candidate image.

In some embodiments, instead of identifying a defined number of image performance scores to use to calculate the image performance score for the candidate image, the data processing system may identify image performance scores that are similar to the candidate image within a threshold. For example, at operation 1032, the data processing system determines which image performance scores correspond to points that are a distance (e.g., a weighted or unweighted distance as described above) within a threshold (e.g., a distance threshold) of the candidate image. The threshold may be a defined threshold as input by a user or administrator. The data processing system may calculate distances between the point for the candidate image and the points on the distribution (e.g., generate a list of distances). The data processing system may compare the distances to the threshold. At operation 1034, the data processing system disregards (e.g., remove from the list) points and the corresponding image performance scores that correspond to distances above the threshold. At operation 1036, the data processing system identifies the points and the image performance scores that correspond to the points that are less than the threshold. In this way, the data processing system may identify image performance scores for images that are similar above a threshold to the candidate image to use to calculate an image performance score for the candidate image. The data processing system may then calculate the candidate image performance score from the identified image performance scores at operation 1030 in a similar manner to the manner described above.

At operation 1038, the data processing system generates a record (e.g., a file, document, table, listing, message, notification, etc.) comprising the candidate image performance score. The data processing system may generate the record by instantiating the record and including or adding the candidate image performance score to the record. In some embodiments, the data processing system may identify the features of the image that correspond to the highest weight (e.g., the features with weights above a threshold and/or a defined number of the highest weighted features such as the five features with the highest weights compared to the other features of the candidate image). The data processing system may include the identified features in the record to indicate the features that had the highest impact on the calculated image performance score for the image.

In some embodiments, the data processing system may add identifications of features that had the highest positive or negative impact on the image performance score for the image in the record. To do so, for example, for each feature extracted from the candidate image, the data processing system may calculate the average image performance scores of images that contain the feature. The data processing system may compare the average image performance scores to a threshold (e.g., a positive threshold) and identify any features that correspond to an image performance score that exceeds the threshold as having a high positive impact on the image performance score. The data processing system may similarly identify features that had a high negative impact on the image performance score by comparing average image performance scores for features to a threshold (e.g., a low threshold) and identifying any features with average image performance scores below the threshold. The data processing system may add identifications of the high performing and low performing features in the record with a corresponding text or other visual description to indicate which features positively and/or negatively impacted the image performance score for the candidate image.

At operation 1040, the data processing system transmits the record to the computing device that requested the image performance score. The data processing system may transmit the record in a data packet that includes the image performance score with or without the candidate image. After doing so, the computing device may display the image performance score and any other data included in the record on a user interface.

Figure 11:
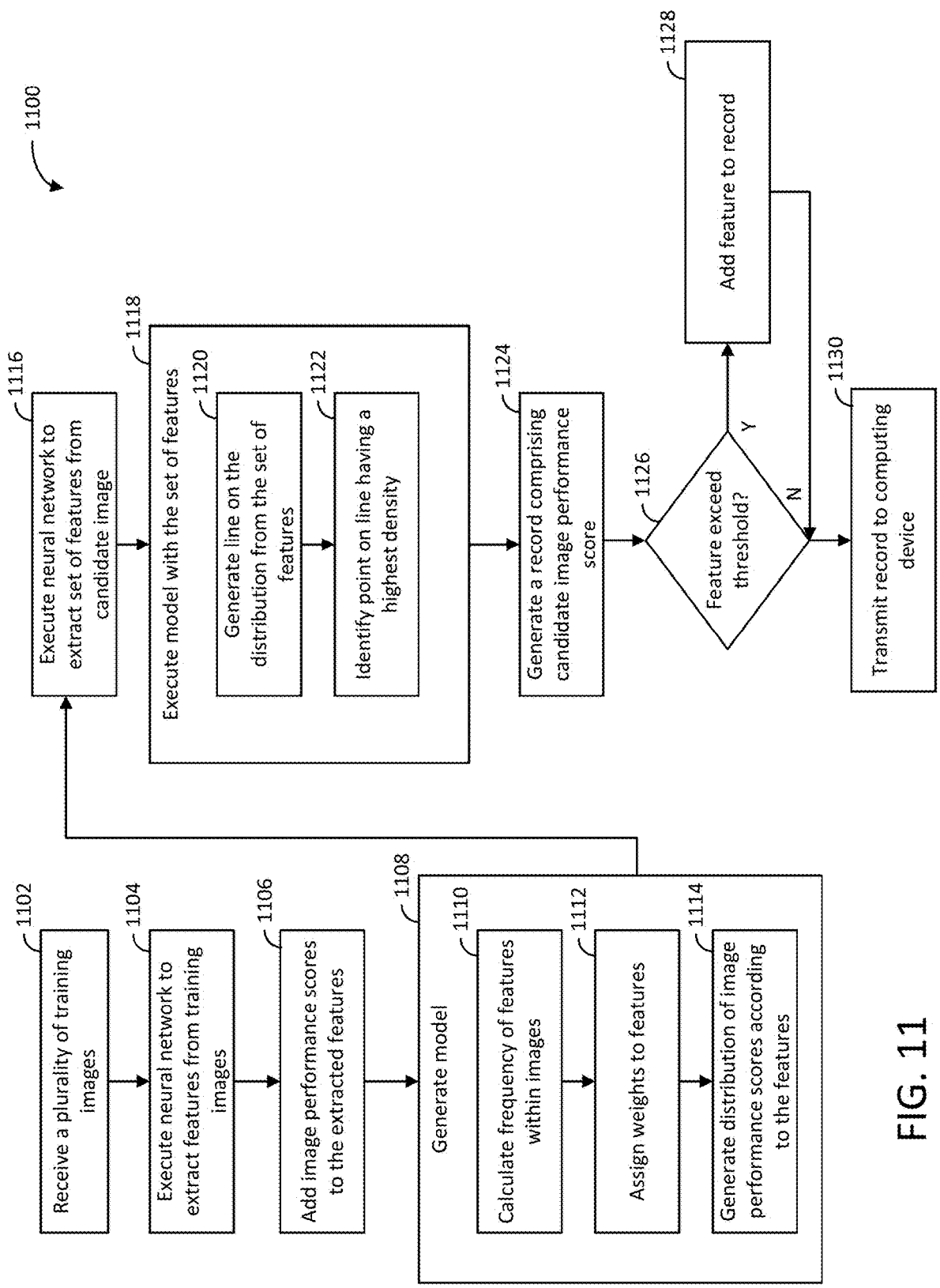
FIG. 11 illustrates another method for training and implementing a model for image evaluation, in accordance with one or more implementations.

FIG. 11 is a flow diagram illustrating a method for training and implementing a model for image evaluation, in accordance with one or more implementations. In some implementations, the method 1100 can be performed by a data processing system such as any of the components of the system of the sequence 918 shown in FIG. 9B or the system 100 shown in FIG. 1. The method 1100 may include more or fewer operations and the operations may be performed in any order. Performance of method 1100 may enable the data processing system to train and use a model to calculate image performance scores for images over time. For example, using one or more neural networks, the data processing system may use training images and performance scores for the training images to generate a series of distributions for the features. The data processing system may include the performance scores for the different training images in the features such that the performance scores may have a separate distribution. The distribution may indicate the confidence in performance scores for different permutations of features according to the frequency of the features that correspond to the respective performance scores. The processing system may compare features from a candidate image without a performance score to the distribution. In doing so, the data processing system may identify a point on the distribution that corresponds to a highest confidence score for the features of the candidate image. The data processing system may identify the performance score that corresponds to the point with the highest confidence score as the image performance score for the candidate image. In this way, the data processing system may generate and execute the model to generate an accurate performance score for the candidate image. As described herein, solely for succinctness, each reference to an image may be a reference to a video.

At operation 1102, the data processing system receives a plurality of training images. At operation 1104, the data processing system executes a neural network to extract features from the training images. The data processing system may receive and extract features from the plurality of images in a similar manner to how the data processing system receives and extracts features from a plurality of training images in operations 1002 as 1004, as described with reference to FIG. 10.

At operation 1106, the data processing system adds performance scores to the extracted features. The data processing system may add the performance scores for the training images to feature vectors comprising values for the extracted features for the corresponding images. For example, the data processing system may execute a neural network to extract a set of features from a training image. The features may be values that represent the features of the training image. The data processing system may generate a feature vector from the values by inserting the values at index values in the feature vector that correspond to the features of the values. The data processing system may then retrieve an image performance score for the training image from memory that the data processing system may have previously calculated using other methods such as one of the models or methods described herein or from a user input. The data processing system may then add the image performance score to the feature vector by concatenating the image performance score to the feature vector or by inserting the image performance score into an index value of the feature vector that corresponds to image performance scores. The data processing system may similarly generate feature vectors with image performance scores for any number of training images.

At operation 1108, the data processing system generates a model. The data processing system may generate the model from the sets of features of the training images and/or the performance scores the data processing system assigned or labeled to the sets of features. For example, during operation 1108, at operation 1110, the data processing system calculates frequencies of the features within the plurality of training images and the image performance scores for the training images. The data processing system may calculate the frequencies by identifying the different types of features that the data processing system extracted from the training images and the image performance scores for the training images. For non-binary features, the data processing system may identify each level of the feature as a separate feature. The data processing system may maintain a counter for each feature. The data processing system may maintain a counter for each possible performance score (e.g., maintain a counter for each natural value between 0 and 100 or for each tenth of a value between 0 and 1). The data processing system may identify the training images from which a feature of a respective image was extracted and that corresponds to a particular image performance score and increment the corresponding counter for each feature and/or image performance score. In the case of binary features, the data processing system may maintain and increment separate counters for training images that have a particular feature and for training images that do not have the same feature. The counts (e.g., the final incremented values after evaluating each training image) of the counters may indicate the frequencies of the features and/or image performance scores within the training images.

In some embodiments, at operation 1112, the data processing system assigns weights to features based on the frequencies. The data processing system may assign the weights to the features by storing associations between the weights and the corresponding features. The data processing system may assign weights to the features according to weights that are input by an administrator or user. In some embodiments, the data processing system may assign the weights based on the frequencies of the features within the training images. For instance, the data processing system may compare the frequencies of the features and calculate weights (e.g., values between 0 and 1 or another scale) for the different features such that features with higher frequencies have higher weights. By doing so, the data processing system may cause the more common features to have a greater impact when the data processing system calculates image performance scores for candidate images. Doing so may improve accuracy as the data processing system may not improperly take less common variables into account that may not be as tuned or accurate in calculating image performance scores. In some embodiments, the data processing system may assign the highest weight to the image performance score feature. By doing so, the data processing system may better distinguish between high performing features (e.g., features that have a high positive impact on image performance scores) and low performing features (e.g., features that have a high negative impact on image performance score).

At operation 1114, the data processing system may generate a distribution of the image performance scores according to the frequencies of the features extracted from the training images. The data processing system may generate the distribution, for example, as a Gaussian mixture model. In such a Gaussian mixture model, each feature, including image performance score, extracted from the training images may have its own Gaussian distribution. Together, the distributions may indicate the confidence of the model in a particular image performance score based on the frequency of the features within a particular region (e.g., a defined set of features and/or frequencies or densities of features) including the image performance score. Higher densities in the distribution may represent the regions with a higher confidence (e.g., a higher confidence score) for an image performance score. For instance, moving along the performance score axis of the distribution toward higher image performance scores, the peaks that exist for higher scores may indicate regions in which the model indicates a high confidence that the features of the region will positively impact an image performance score. Accordingly, the data processing system may generate a model from a distribution of features in a set of training images and image performance scores for the training images such that the data processing system may use the model to calculate image performance scores for candidate images.

The data processing system may update the distribution of the image performance scores and/or frequencies of features over time. To do so, for example, the data processing system may identify a new training image (e.g., a second training image) that corresponds to the same target audience as the model and/or the training images used to generate the model. The data processing system may extract features from the new training image and increment the counters of the distribution according to the extracted features. The data processing system may also identify a new image performance score that corresponds to the new training image. The data processing system may increment a counter that correspond to the new image performance score to update the distribution. By doing so over time, the data processing system may update the distribution taking into account changes in performance of images as people develop new tastes.

In some embodiments, after generating the model, the data processing system may store the generated model in memory (e.g., in a binary file). The data processing system may store the model with an identifier of the target audience that corresponded to the training images the data processing system used to generate the model. The data processing system may similarly generate and store models using training images that correspond to other target audiences such that the data processing system may use the model to simulate the different respective target audiences to calculate image performance scores for new unscored images.

At operation 1116, the data processing system executes a neural network to extract a set of features from a candidate image. The data processing system may do so, for example, in response to receiving a request from a computing device for an image performance score (e.g., a candidate image performance score) for the candidate image. The computing device may include the candidate image in the request or include an identification of the candidate image in the request that the data processing system may use to query memory or a remote computer to retrieve the candidate image. In some embodiments, the data processing system may identify a target audience for the candidate image. The data processing system may do so, for example, by identifying an identification of the target audience in the request or from a stored identification of the target audience in the database from which the data processing system retrieved the image. The data processing system may extract the set of features from the candidate image similar to how the data processing system extracted features from the training images as described with reference to operation 1104.

At operation 1118, the data processing system executes the model with the set of features from the candidate image. In some embodiments, the data processing system may do so after determining the target audience associated with the image matches the target audience associated with the model (e.g., the data processing system may compare the target audience for the candidate image with target audience identifiers of multiple models trained in a similar manner to the manner described with respect to operations 1102-1114 but with images associated with different target audiences and identify the model based on the target audience identifiers matching). The data processing system may execute the model with the set of features from the candidate image, for example, by generating a feature vector from the set of features the data processing system extracted from the candidate image and inputting the feature vector into the model. Operations 1120 and 1122 may be performed by the model upon execution by the data processing system.

Upon executing the model with the set of features, at operation 1120, the data processing system (e.g., via the model) generates a line on the distribution from the set of features of the candidate image. The data processing system may generate the line as a plurality of points indicating the features the data processing system extracted from the candidate image. The points on the line may also or instead each indicate a different confidence score for a different image performance score for the candidate image. The confidence score may indicate a frequency or density of features that correspond to a particular image performance score (e.g., high frequencies of features (e.g., a high density of features) that correspond to a particular image performance score or set of image performance scores may indicate a high confidence that images that have the high frequency features will have the image performance score as well). In some embodiments, the data processing system may calculate the frequency or density of features for a point using a Gaussian density function At operation 1122, the data processing system identifies a point on the line that has a highest density or highest frequency of features of the plurality of points on the line. The data processing system may compare the frequencies or densities of each of the plurality of points on the line. As described above, each frequency or density for a point may indicate a confidence of the model in the image performance score or image performance scores that correspond to the point. The data processing system may calculate such frequencies or densities for points by calculating the frequencies or densities of different features that correspond to the individual points of image performance scores. Higher frequencies or densities and/or higher confidence in an image performance score. The data processing system may compare the frequencies or densities for the different points and identify the points that correspond to the highest frequency or density. The data processing system may identify the image performance score that corresponds to the point to identify the candidate image performance score for the candidate image.

At operation 1124, the data processing system generates a record comprising the candidate image performance score for the candidate image. To do so, the data processing system may instantiate the record and include or add the candidate image performance score to the record.

In some embodiments, the data processing system may include or add identifications of features that had the highest positive or negative impact on the image performance score for the candidate image. For example, at operation 1126, the data processing system may determine which features correspond to a frequency above a first threshold and a performance score above a second threshold. The data processing system may do so by identifying higher performance scores (e.g., performance scores above the second threshold) in the distribution on the line and identify the frequencies of features that correspond to the higher performance scores. The data processing system may compare the frequencies to the first threshold and identify features with frequencies that exceed the first threshold based on the comparison. The data processing system may similarly calculate features that had the most negative impact on the candidate image's performance score by identifying performance scores below a fifth threshold on the line and features that have a frequency above the first threshold or a sixth threshold.

At operation 1128, the data processing system may add the features identified as having the most positive impact and/or the features identified as having the most negative impact on the image performance score of the candidate image to the record. The data processing system may include the positive impact and/or negative impact features in the record depending on the request (e.g., the data processing system may only include the positive impact features and/or the negative impact features if a request for such features was included in the request from the computing device for an image performance score for the candidate image).

In some embodiments, the data processing system may add recommendations of features to change in the candidate image to improve the image performance score of the candidate image. To do so, the data processing system may identify regions in the distribution in which the image performance scores are high (e.g., above a threshold). The data processing system may identify features with high frequencies in the region as features that can improve the performance score of an image. The data processing system may add an identification of the identified high performing features to the record with a textual description indicating the features in the candidate image or future images that would increase the image performance score of the candidate image or the future images.

In some embodiments, the data processing system may automatically transform the candidate to include a high performing feature. For example, the data processing system may identify features that correspond to high image performance scores as described above. The data processing system may then add the high performing feature to the candidate image by replacing a current feature with the high performing feature or otherwise adding the high performing feature to the training image. In this way, the data processing system may automatically improve the performance of the candidate image.

At operation 1130, the data processing system transmits the record to the computing device that requested the image performance score for the candidate image. The data processing system may transmit the record in a data packet that includes the image performance score with or without the candidate image. After doing so, the computing device may display the image performance score and any other data included in the record on a user interface.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:
1. A method, comprising:
  determining, by a computing device, a target audience of a plurality of training content items;
  assigning, by the computing device, an identifier of the target audience to a model;
  receiving, by the computing device, a request including a candidate content item and an identification of the target audience, the candidate content item corresponding to a plurality of features;
  determining, by the computing device, the candidate content item is of the target audience;
  determining, by the computing device using the model, a candidate content item performance score for the candidate content item based on an impact of each of the plurality of features on performance scores generated by the model for the target audience,
    wherein determining the candidate content item performance score using the model comprises executing the model using the candidate content item responsive to determining the target audience of the candidate content item matches the assigned identifier of the generated model; and
  generating, by the computing device, a record identifying the candidate content item performance score for the candidate content item.

2. The method of claim 1, wherein determining the candidate content item performance score using the model comprises:
identifying, by the computing device, a subset of the plurality of features;
identifying, by the computing device, a set of first content item performance scores that are within a distance threshold of the subset; and
calculating, by the computing device, the candidate content item performance score for the candidate content item based on the set of first content item performance scores.

3. The method of claim 2, wherein determining the candidate content item performance score using the model comprises calculating, by the computing device, an average of the set of first content item performance scores.

4. The method of claim 1, wherein determining the candidate content item performance score using the model comprises:
identifying, by the computing device, a subset of the plurality of features;
identifying, by the computing device, a predetermined number of content item performance scores of the model closest to the subset; and
calculating, by the computing device, the candidate content item performance score for the candidate content item based on the predetermined number of content item performance scores.

5. The method of claim 1, further comprising:
generating, by the computing device, the model by generating a distribution of first content item performance scores for a plurality of training content items according to the plurality of features of the plurality of training content items.

6. A method, comprising:
receiving, by a computing device, a request including a candidate content item and an identification of a target audience, the candidate content item corresponding to a plurality of features;
determining, by the computing device using a model, a candidate content item performance score for the candidate content item based on an impact of each of the plurality of features on performance scores generated by the model for the target audience,
wherein determining the candidate content item performance score using the model comprises:
identifying, by the computing device, a subset of the plurality of features;
identifying, by the computing device, a set of first content item performance scores that are within a distance threshold of the subset;
calculating, by the computing device, an average of the set of first content item performance scores according to performance score weights for the set of first content item performance scores; and
calculating, by the computing device, the candidate content item performance score based on the calculated average; and
generating, by the computing device, a record identifying the candidate content item performance score for the candidate content item.

7. A method, comprising:
receiving, by a computing device, a request including a candidate content item and an identification of a target audience, the candidate content item corresponding to a plurality of features;
determining, by the computing device using a model, a candidate content item performance score for the candidate content item based on an impact of each of the plurality of features on performance scores generated by the model for the target audience,
wherein determining the candidate content item performance score using the model comprises:
identifying, by the computing device, a subset of the plurality of features;
identifying, by the computing device, a set of first content item performance scores that are within a distance threshold of the subset; and
calculating, by the computing device, a performance score weight for a second content item performance score of the set of first content item performance scores according to a distance between the plurality of features and a fourth set of features corresponding to the second content item performance score,
calculating an average of the set of first content item performance scores based at least on the performance score weight for the second content item performance score; and
calculating, by the computing device, the candidate content item performance score based on the calculated average; and
generating, by the computing device, a record identifying the candidate content item performance score for the candidate content item.

8. The method of claim 7, wherein determining the candidate content item performance score using the model comprises:
identifying, by the computing device, feature weights for the plurality of features or the fourth set of features; and
calculating, by the computing device, the distance between the plurality of features and the fourth set of features as a weighted average of distance between features according to the identified feature weights.

9. The method of claim 7, further comprising:
calculating, by the computing device, a smoothness of a region comprising the second content item performance score,
wherein determining the candidate content item performance score using the model comprises:
adjusting, by the computing device, the performance score weight for the second content item performance score according to the calculated smoothness, and
wherein calculating the average of the set of first content item performance scores based at least on the performance score weight for the second content item performance score comprises calculating, by the computing device, the average of the set of first content item performance scores based at least on the adjusted performance score weight.

10. The method of claim 9, wherein calculating the smoothness of the region comprising the second content item performance score comprises:
calculating, by the computing device, one or more differences between content item performance scores in the region; and
calculating, by the computing device, the smoothness of the region according to the calculated one or more differences.

11. A method, comprising
receiving, by a computing device, a request including a candidate content item and an identification of a target audience, the candidate content item corresponding to a plurality of features;
determining, by the computing device using a model, a candidate content item performance score for the candidate content item based on an impact of each of the plurality of features on performance scores generated by the model for the target audience,
wherein determining the candidate content item performance score using the model comprises:
identifying, by the computing device, a subset of the plurality of features;
calculating, by the computing device, a first set of content item performance scores that each correspond to fourth sets of features that are within a distance threshold of the subset of the plurality of features;
calculating, by the computing device, a value based on a first size of the first set of content item performance scores;
identifying, by the computing device, a second set of content item performance scores closest to the subset, a second size of the second set of content item performance scores equal to the value; and
calculating, by the computing device, the candidate content item performance score for the candidate content item based on the second set of content item performance scores; and
generating, by the computing device, a record identifying the candidate content item performance score for the candidate content item.

12. A system, comprising:
one or processors coupled with memory, the memory storing instructions that, when executed by the one or more processors, cause the one or more processors to:
determine a target audience of a plurality of training content items;
assign an identifier of the target audience to a model;
receive a request including a candidate content item and an identification of a target audience, the candidate content item corresponding to a plurality of features;
determine the candidate content item is of the target audience;
determine, using the model, a candidate content item performance score for the candidate content item based on an impact of each of the plurality of features on performance scores generated by the model for the target audience,
wherein the instructions cause the one or more processors to determine the candidate content item performance score using the model by executing the model using the candidate content item responsive to determining the target audience of the candidate content item matches the assigned identifier of the generated model; and
generate a record identifying the candidate content item performance score for the candidate content item.

13. The system of claim 12, wherein the instructions cause the one or more processors to determine the candidate content item performance score using the model by:
identifying a subset of the plurality of features;
identifying a set of first content item performance scores that are within a distance threshold of the subset; and
calculating the candidate content item performance score for the candidate content item based on the set of first content item performance scores.

14. The system of claim 13, wherein the instructions cause the one or more processors to determine the candidate content item performance score using the model by calculating an average of the set of first content item performance scores.

15. The system of claim 14, wherein the instructions cause the one or more processors to determine the candidate content item performance score using the model by calculating the average of the set of first content item performance scores according to performance score weights for the set of first content item performance scores.

16. The system of claim 14, wherein the instructions cause the one or more processors to determine the candidate content item performance score using the model by:
calculating a performance score weight for a second content item performance score of the set of first content item performance scores according to a distance between the plurality of features and a fourth set of features corresponding to the second content item performance score,
wherein the instructions cause the one or more processors to calculate the average of the set of first content item performance scores by calculating the average based at least on the performance score weight for the second content item performance score.

17. Non-transitory computer-readable media comprising instructions that, when executed by one or more processors, cause the one or more processors to:
determine a target audience of a plurality of training content items;
assign an identifier of the target audience to a model;
receive a request including a candidate content item and an identification of a target audience, the candidate content item corresponding to a plurality of features;
determine the candidate content item is of the target audience;
determine, using the model, a candidate content item performance score for the candidate content item based on an impact of each of the plurality of features on performance scores generated by the model for the target audience,
wherein the instructions cause the one or more processors to determine the candidate content item performance score using the model by executing the model using the candidate content item responsive to determining the target audience of the candidate content item matches the assigned identifier of the generated model; and
generate a record identifying the candidate content item performance score for the candidate content item.

18. The non-transitory computer-readable media of claim 17, wherein the instructions cause the one or more processors to determine the candidate content item performance score using the model by:
identifying a subset of the plurality of features;
identifying a set of first content item performance scores that are within a distance threshold of the subset; and
calculating the candidate content item performance score for the candidate content item based on the set of first content item performance scores.

19. The non-transitory computer-readable media of claim 18, wherein the instructions cause the one or more processors to determine the candidate content item performance score using the model by calculating an average of the set of first content item performance scores.

* * * * *